(12) United States Patent
Lazier et al.

(10) Patent No.: US 10,678,664 B1
(45) Date of Patent: Jun. 9, 2020

(54) HYBRIDIZED STORAGE OPERATION FOR REDUNDANCY CODED DATA STORAGE SYSTEMS

(71) Applicant: Amazon Technologies, Inc., Seattle, WA (US)

(72) Inventors: Colin Laird Lazier, Seattle, WA (US); James Caleb Kirschner, Seattle, WA (US); Adam Frederick Brock, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/083,145

(22) Filed: Mar. 28, 2016

(51) Int. Cl.
G06F 11/00 (2006.01)
G06F 11/20 (2006.01)
G06F 11/10 (2006.01)

(52) U.S. Cl.
CPC ...... *G06F 11/2069* (2013.01); *G06F 11/1076* (2013.01); *G06F 11/2094* (2013.01); *G06F 2201/805* (2013.01)

(58) Field of Classification Search
CPC .................. G06F 11/2094; G06F 11/1076
See application file for complete search history.

(56) References Cited

U.S. PATENT DOCUMENTS

| | | |
|---|---|---|
| 5,729,671 A | 3/1998 | Peterson et al. |
| 6,249,836 B1 | 6/2001 | Downs et al. |
| 6,665,565 B1 | 12/2003 | Stomberg et al. |
| 6,779,150 B1 | 8/2004 | Walton et al. |
| 6,862,362 B2 | 3/2005 | Gangadhar |
| 6,922,700 B1 | 7/2005 | Aggarwal et al. |

(Continued)

FOREIGN PATENT DOCUMENTS

| | | |
|---|---|---|
| JP | 2004531923 A | 10/2004 |
| KR | 20130107383 A | 10/2013 |

(Continued)

OTHER PUBLICATIONS

Amazon, "Batch Cloud Data Transfer Services—Amazon Import/Export Snowball Appliance," Jun. 17, 2016, retrieved Oct. 8, 2016, https://web.archive.org/web/20160617044144/http://aws.amazon.com/importexport/, 6 pages.

(Continued)

*Primary Examiner* — Philip Guyton
(74) *Attorney, Agent, or Firm* — Davis Wright Tremaine LLP

(57) ABSTRACT

A cluster of data transfer devices is used to augment the capabilities of a data storage system. For example, the cluster of data transfer devices may be configured to store a portion of a bundle of redundancy coded shards in a similar fashion as a data storage system. As another example, the cluster may be configured to provide other capabilities incident to the devices used, such as computational capabilities. Data stored on the cluster may be read from and written directly to the cluster without transfer of data to the data storage system. In some embodiments, a connecting entity (such as a customer entity) may interchangeably interface with the data storage system and the cluster, and the requested capabilities may be directed to either in a fashion that is transparent to the requestor.

23 Claims, 11 Drawing Sheets

(56) References Cited

U.S. PATENT DOCUMENTS

| | | | |
|---|---|---|---|
| 7,117,294 B1* | 10/2006 | Mi | G06F 3/0605 |
| | | | 711/101 |
| 7,142,150 B2 | 11/2006 | Thackray | |
| 7,380,129 B2 | 5/2008 | Keohane et al. | |
| 7,490,013 B2 | 2/2009 | Wells | |
| 7,693,813 B1 | 4/2010 | Cao et al. | |
| 7,783,600 B1 | 8/2010 | Spertus et al. | |
| 7,805,706 B1 | 9/2010 | Ly et al. | |
| 7,930,611 B2 | 4/2011 | Huang et al. | |
| 8,261,033 B1 | 9/2012 | Slik et al. | |
| 8,386,841 B1 | 2/2013 | Renade | |
| 8,413,187 B1 | 4/2013 | Del Sesto et al. | |
| 8,479,078 B2 | 7/2013 | Resch et al. | |
| 8,504,518 B1 | 8/2013 | Ghemawat et al. | |
| 8,504,535 B1 | 8/2013 | He et al. | |
| 8,612,219 B2 | 12/2013 | Tsuchinaga et al. | |
| 8,621,069 B1 | 12/2013 | Tompkins | |
| 8,706,980 B2 | 4/2014 | Dhuse et al. | |
| 8,769,049 B2* | 7/2014 | Murphy | G06F 11/1456 |
| | | | 707/637 |
| 8,788,855 B2 | 7/2014 | Cong et al. | |
| 8,806,296 B1 | 8/2014 | Lazier | |
| 8,850,288 B1 | 9/2014 | Lazier et al. | |
| 8,868,825 B1 | 10/2014 | Hayes et al. | |
| 8,869,001 B1 | 10/2014 | Lazier | |
| 8,935,221 B1 | 1/2015 | Lazier et al. | |
| 8,935,761 B2 | 1/2015 | Gladwin et al. | |
| 8,938,591 B2 | 1/2015 | Mark et al. | |
| 8,959,067 B1 | 2/2015 | Patiejunas et al. | |
| 8,984,363 B1 | 3/2015 | Juels et al. | |
| 8,984,384 B1* | 3/2015 | Juels | G06F 21/64 |
| | | | 714/800 |
| 9,002,805 B1 | 4/2015 | Barber et al. | |
| 9,003,144 B1 | 4/2015 | Hayes et al. | |
| 9,009,491 B2 | 4/2015 | Resch | |
| 9,021,297 B1 | 4/2015 | Hayes et al. | |
| 9,047,214 B1 | 6/2015 | Northcott | |
| 9,052,942 B1 | 6/2015 | Barber et al. | |
| 9,092,441 B1 | 7/2015 | Patiejunas et al. | |
| 9,110,797 B1 | 8/2015 | Lazier | |
| 9,165,002 B1 | 10/2015 | Lazier | |
| 9,208,018 B1 | 12/2015 | Northcott et al. | |
| 9,213,485 B1 | 12/2015 | Hayes et al. | |
| 9,213,709 B2 | 12/2015 | Patiejunas et al. | |
| 9,218,244 B1 | 12/2015 | Hayes et al. | |
| 9,223,789 B1 | 12/2015 | Seigle et al. | |
| 9,225,675 B2 | 12/2015 | Patiejunas et al. | |
| 9,244,761 B2 | 1/2016 | Yekhanin et al. | |
| 9,250,811 B1 | 2/2016 | Patiejunas | |
| 9,251,097 B1 | 2/2016 | Kumar et al. | |
| 9,256,467 B1 | 2/2016 | Singh et al. | |
| 9,256,761 B1 | 2/2016 | Sahu et al. | |
| 9,270,683 B2 | 2/2016 | Coughlin et al. | |
| 9,271,052 B2 | 2/2016 | Holden | |
| 9,281,845 B1 | 3/2016 | Lazier | |
| 9,298,760 B1 | 3/2016 | Li et al. | |
| 9,354,683 B2 | 5/2016 | Patiejunas et al. | |
| 9,378,084 B2 | 6/2016 | Calder et al. | |
| 9,405,333 B1 | 8/2016 | Pine | |
| 9,448,614 B2 | 9/2016 | Slik | |
| 9,449,346 B1 | 9/2016 | Hockey et al. | |
| 9,459,959 B1 | 10/2016 | Franklin et al. | |
| 9,461,876 B2 | 10/2016 | Van Dusen et al. | |
| 9,495,249 B1 | 11/2016 | Franklin et al. | |
| 9,495,255 B2 | 11/2016 | Davis et al. | |
| 9,513,820 B1 | 12/2016 | Shalev | |
| 9,563,681 B1 | 2/2017 | Patiejunas et al. | |
| 9,672,110 B1 | 6/2017 | Patel | |
| 9,753,669 B2 | 9/2017 | Ben-Shaul et al. | |
| 9,785,495 B1 | 10/2017 | Lazier et al. | |
| 9,792,179 B1 | 10/2017 | Lazier | |
| 9,825,625 B2 | 11/2017 | Thalheim | |
| 9,825,652 B1 | 11/2017 | Lazier | |
| 9,838,041 B1 | 12/2017 | Lazier | |
| 9,838,042 B1 | 12/2017 | Lazier | |
| 9,853,662 B1 | 12/2017 | Lazier et al. | |
| 9,866,242 B1 | 1/2018 | Lazier | |
| 9,904,589 B1 | 2/2018 | Donlan et al. | |
| 9,923,966 B1 | 3/2018 | Franklin et al. | |
| 9,934,389 B2 | 4/2018 | Paterra et al. | |
| 9,998,539 B1 | 6/2018 | Brock et al. | |
| 10,097,356 B2 | 10/2018 | Zinder | |
| 2003/0032417 A1 | 2/2003 | Minear et al. | |
| 2003/0172325 A1 | 9/2003 | Wyatt et al. | |
| 2004/0040025 A1 | 2/2004 | Lehtinen | |
| 2004/0054997 A1 | 3/2004 | Katragadda et al. | |
| 2004/0128470 A1 | 7/2004 | Hetzler et al. | |
| 2004/0230764 A1 | 11/2004 | Merchant et al. | |
| 2004/0268037 A1 | 12/2004 | Buchanan et al. | |
| 2006/0004675 A1 | 1/2006 | Bennett et al. | |
| 2006/0064709 A1 | 3/2006 | Throckmorton et al. | |
| 2006/0074954 A1 | 4/2006 | Hartline et al. | |
| 2006/0080574 A1 | 4/2006 | Saito et al. | |
| 2006/0117217 A1 | 6/2006 | Chien et al. | |
| 2006/0136928 A1 | 6/2006 | Crawford et al. | |
| 2006/0168575 A1 | 7/2006 | Bhatt et al. | |
| 2006/0168581 A1 | 7/2006 | Goger et al. | |
| 2007/0118657 A1 | 5/2007 | Kreitzer et al. | |
| 2007/0124020 A1 | 5/2007 | Staples | |
| 2007/0156842 A1 | 7/2007 | Vermeulen et al. | |
| 2007/0180294 A1 | 8/2007 | Kameyama et al. | |
| 2007/0245331 A1 | 10/2007 | Daynes et al. | |
| 2008/0033914 A1 | 2/2008 | Cherniack et al. | |
| 2008/0189705 A1 | 8/2008 | Weinert et al. | |
| 2009/0094250 A1* | 4/2009 | Dhuse | G06F 11/1004 |
| 2009/0319078 A1 | 12/2009 | Jackson | |
| 2010/0131792 A1 | 5/2010 | Herrod | |
| 2010/0138764 A1 | 6/2010 | Hatambeiki et al. | |
| 2010/0153941 A1 | 6/2010 | Borissov et al. | |
| 2010/0306267 A1* | 12/2010 | Zamkoff | G06F 11/1456 |
| | | | 707/783 |
| 2010/0318999 A1 | 12/2010 | Zhao et al. | |
| 2010/0328528 A1 | 12/2010 | Eggert | |
| 2010/0332751 A1 | 12/2010 | Quigley et al. | |
| 2011/0022633 A1 | 1/2011 | Bernosky et al. | |
| 2011/0055661 A1 | 3/2011 | Grube et al. | |
| 2011/0078277 A1 | 3/2011 | Baptist | |
| 2011/0202929 A1 | 8/2011 | Schleimer et al. | |
| 2011/0225209 A1* | 9/2011 | Volvovski | G06F 12/0646 |
| | | | 707/803 |
| 2011/0225426 A1 | 9/2011 | Agarwal et al. | |
| 2011/0264717 A1 | 10/2011 | Grube et al. | |
| 2011/0289263 A1 | 11/2011 | McWilliams et al. | |
| 2011/0296195 A1 | 12/2011 | Nakagawa et al. | |
| 2011/0296440 A1 | 12/2011 | Laurich et al. | |
| 2012/0011398 A1 | 1/2012 | Eckhardt et al. | |
| 2012/0017096 A1 | 1/2012 | Snider | |
| 2012/0079189 A1 | 3/2012 | Colgrove et al. | |
| 2012/0079190 A1 | 3/2012 | Colgrove et al. | |
| 2012/0110150 A1 | 5/2012 | Kosuru et al. | |
| 2012/0185437 A1* | 7/2012 | Pavlov | G06F 17/30094 |
| | | | 707/652 |
| 2012/0243687 A1 | 9/2012 | Li et al. | |
| 2012/0254089 A1 | 10/2012 | Alba et al. | |
| 2012/0254175 A1 | 10/2012 | Horowitz et al. | |
| 2012/0254690 A1* | 10/2012 | Resch | G06F 11/1044 |
| | | | 714/763 |
| 2012/0290539 A1 | 11/2012 | Bryant et al. | |
| 2012/0297311 A1 | 11/2012 | Duggal | |
| 2012/0310878 A1 | 12/2012 | Vuksan et al. | |
| 2012/0322422 A1 | 12/2012 | Frecks, Jr. et al. | |
| 2012/0331088 A1 | 12/2012 | O'Hare et al. | |
| 2013/0007511 A1 | 1/2013 | Gaertner et al. | |
| 2013/0029641 A1 | 1/2013 | Hickie | |
| 2013/0073600 A1 | 3/2013 | Jenkins et al. | |
| 2013/0109371 A1 | 5/2013 | Brogan et al. | |
| 2013/0151653 A1 | 6/2013 | Sawicki et al. | |
| 2013/0191527 A1 | 7/2013 | Ashok et al. | |
| 2013/0238932 A1 | 9/2013 | Resch | |
| 2013/0275776 A1 | 10/2013 | Baptist et al. | |
| 2013/0297964 A1 | 11/2013 | Hegdal et al. | |
| 2013/0304711 A1 | 11/2013 | Resch | |
| 2013/0326583 A1 | 12/2013 | Freihold et al. | |
| 2014/0006458 A1 | 1/2014 | Hsieh et al. | |

(56) References Cited

U.S. PATENT DOCUMENTS

| | | |
|---|---|---|
| 2014/0006850 A1 | 1/2014 | Aliev et al. |
| 2014/0007214 A1 | 1/2014 | Qureshi et al. |
| 2014/0046906 A1 | 2/2014 | Patiejunas et al. |
| 2014/0046908 A1 | 2/2014 | Patiejunas et al. |
| 2014/0046909 A1 | 2/2014 | Patiejunas et al. |
| 2014/0047040 A1 | 2/2014 | Patiejunas et al. |
| 2014/0047261 A1 | 2/2014 | Patiejunas et al. |
| 2014/0108421 A1* | 4/2014 | Isaacson ............ G06F 17/3033 707/747 |
| 2014/0122572 A1 | 5/2014 | Finkelstein et al. |
| 2014/0149794 A1 | 5/2014 | Shetty et al. |
| 2014/0149986 A1 | 5/2014 | S M et al. |
| 2014/0153481 A1 | 6/2014 | Draznin et al. |
| 2014/0156632 A1 | 6/2014 | Yu et al. |
| 2014/0173058 A1 | 6/2014 | Twitchell, Jr. |
| 2014/0189388 A1 | 7/2014 | Lynar et al. |
| 2014/0201541 A1 | 7/2014 | Paul et al. |
| 2014/0207680 A1 | 7/2014 | Rephlo |
| 2014/0298134 A1 | 10/2014 | Grube et al. |
| 2014/0304356 A1 | 10/2014 | Allen, Sr. et al. |
| 2014/0310571 A1 | 10/2014 | Fetterly et al. |
| 2014/0344446 A1 | 11/2014 | Rjeili et al. |
| 2014/0351632 A1 | 11/2014 | Grube et al. |
| 2014/0372383 A1 | 12/2014 | Sipek |
| 2014/0380126 A1 | 12/2014 | Yekhanin et al. |
| 2015/0058473 A1 | 2/2015 | Grande |
| 2015/0149870 A1 | 5/2015 | Kozat |
| 2015/0154111 A1 | 6/2015 | D'Abreu et al. |
| 2015/0169716 A1 | 6/2015 | Franklin et al. |
| 2015/0175333 A1 | 6/2015 | Richardson et al. |
| 2015/0256423 A1 | 9/2015 | Stearns |
| 2015/0278324 A1 | 10/2015 | Wong et al. |
| 2015/0324745 A1 | 11/2015 | Goodall et al. |
| 2015/0331635 A1 | 11/2015 | Ben-Shaul et al. |
| 2015/0350316 A1 | 12/2015 | Calder et al. |
| 2015/0350362 A1 | 12/2015 | Pollack et al. |
| 2015/0355974 A1 | 12/2015 | Hayes et al. |
| 2015/0356005 A1 | 12/2015 | Hayes et al. |
| 2016/0011816 A1 | 1/2016 | Aizman |
| 2016/0034295 A1 | 2/2016 | Cochran |
| 2016/0041868 A1 | 2/2016 | Davis et al. |
| 2016/0041869 A1 | 2/2016 | Davis et al. |
| 2016/0041878 A1 | 2/2016 | Davis et al. |
| 2016/0041887 A1 | 2/2016 | Davis et al. |
| 2016/0048399 A1 | 2/2016 | Shaw |
| 2016/0062623 A1 | 3/2016 | Howard et al. |
| 2016/0085797 A1 | 3/2016 | Patiejunas et al. |
| 2016/0092248 A1 | 3/2016 | Shani et al. |
| 2016/0179824 A1 | 6/2016 | Donlan et al. |
| 2016/0216991 A1 | 7/2016 | Ansari et al. |
| 2016/0335310 A1 | 11/2016 | Lahiri et al. |
| 2017/0024281 A1 | 1/2017 | Franklin et al. |
| 2017/0060687 A1 | 3/2017 | Franklin et al. |
| 2017/0180346 A1 | 6/2017 | Suarez et al. |
| 2017/0222814 A1 | 8/2017 | Oberhauser et al. |
| 2017/0235848 A1 | 8/2017 | Van Dusen et al. |
| 2017/0250801 A1 | 8/2017 | Chen et al. |
| 2017/0262697 A1 | 9/2017 | Kaps et al. |
| 2017/0293669 A1 | 10/2017 | Madhavan et al. |
| 2017/0295023 A1 | 10/2017 | Madhavan et al. |
| 2017/0331896 A1 | 11/2017 | Holloway et al. |
| 2018/0082256 A1 | 3/2018 | Tummuru et al. |

FOREIGN PATENT DOCUMENTS

| | | |
|---|---|---|
| WO | 02071382 A1 | 9/2002 |
| WO | 2014047073 A1 | 3/2014 |

OTHER PUBLICATIONS

Barr, "AWS Import/Export: Ship Us That Disk!," Amazon Web Services Blog, May 21, 2009, retrieved Mar. 14, 2017, https://aws.amazon.com/blogs/aws/send-us-that-data/, 7 pages.

Dang, Q., "Recommendation for Applications Using Approved Hash Algorithms," NIST Special Publication 800-107, Revision 1, National Institute of Standards and Technology (NIST), Aug. 2010, <http://csrc.nist.gov/publications/nistpubs/800-107-rev1/sp800-107-rev1.pdf> [retrieved Nov. 24, 2015], 25 pages.

International Search Report and Written Opinion dated Aug. 25, 2016, International Patent Application No. PCT/US2016/040510, filed Jun. 30, 2016.

Storer et al., "Potshards—A Secure, Recoverable, Long-Term Archival Storage System," ACM Transactions on Storage, Published Jun. 2009, vol. 5, No. 2, Article 5, pp. 5:1 to 5:35.

Zyga, "Light-up Cereal Boxes Powered by Shelvers on Display at CES," Phys.org, Jan. 11, 2011, retrieved May 19, 2015, http://phys.org/news/201101lightupcerealpoweredshelvesces.html, 13 pages.

"New! xTablet T7000 Rugged Mini Tablet PC," MobileDemand, copyright 2012 [web archive Mar. 12, 2012], https://web.archive.org/web/20120312010139/http://www.ruggedtabletpc.com/products/xtablet-t7000-rugged-mini-tablet-pc/, 3 pages.

Binns, "Elasticsearch Failure and Recovery," TechRabbit, Oct. 31, 2014 [retrieved Nov. 17, 2017], http://tech.taskrabbit.com/blog/2014/10/31/es-failure-recovery/, four pages.

Franco, "Understanding Bitcoin: Cryptography, Engineering and Economics," Wiley, Nov. 24, 2014, 167 pages.

International Search Report and Written Opinion dated Nov. 22, 2017, International Patent Application No. PCT/US2017/054319, filed Sep. 29, 2017, 14 pages.

Kim, "How Sharding Works," Medium, Dec. 5, 2014 [retrieved Nov. 17, 2017], https://medium.com/@jeeyoungk/how-sharding-works-b4dec46b3f6, 12 pages.

MacCarthaigh, "Shuffle Sharding: Massive and Magical Fault Isolation," AWS Architecture Blog, Apr. 14, 2014 [retrieved Nov. 27, 2017], https://aws.amazon.com/blogs/architecture/shuffle-sharding-massive-and-magical-fault-isolation/, six pages.

Pikkarainen et al., "The impact of agile practices on communication in software development," Empirical Software Engineering 13(3):303-37, Jun. 1, 2008.

Ramamritham, "Allocation and scheduling of precedence-related periodic tasks," IEEE Transactions on Parallel and Distributed Systems 6(4):412-420, Apr. 1995.

Swan, "Blockchain: Blueprint for a New Economy," O'Reilly Media, Inc., Jan. 22, 2015, 144 pages.

Thiele et al., "Embedded Software in Network Processors—Models and Algorithms," Lecture Notes in Computer Science 2211:416-34, Oct. 8, 2001.

Zheng et al., "Grid-partition index: a hybrid method for nearest-neighbor queries in wireless location-based services," The VLDB Journal—The International Journal on Very Large Data Bases 15(1):21-39, online publication Jul. 22, 2005, print publication Jan. 1, 2006.

He et al., "Elastic Application Container: A Lightweight Approach for Cloud Resource Provisioning," 26th IEEE International Conference on Advanced Information Networking and Applications, Mar. 26, 2012, pp. 15-22.

International Organization for Standardization/ International Electrotechnical Commission, "Information technology—Trusted Platform Module—Part 1: Overview," International Standard, ISO/IEC 11889-1(E), May 15, 2009, 20 pages.

International Organization for Standardization/International Electrotechnical Commission, "Information technology—Trusted Platform Module—Part 2: Design principles," International Standard, ISO/IEC 11889-2(E), May 15, 2009, 152 pages.

International Organization for Standardization/International Electrotechnical Commission, "Information technology—Trusted Platform Module—Part 3: Structures," International Standard, ISO/IEC 11889-3:2009(E), 204 pages.

International Organization for Standardization/International Electrotechnical Commission, "Information technology—Trusted Platform Module—Part 4: Commands," International Standard, ISO/IEC 11889-4:2009(E), 254 pages.

International Search Report and Written Opinion in International Patent Application No. PCT/US2015/050513, dated Feb. 16, 2016, 22 pages.

(56) References Cited

OTHER PUBLICATIONS

International Search Report and Written Opinion dated Feb. 4, 2016, International Patent Application No. PCT/US2015/059983, 12 pages.

Soltesz et al., "Container-based operating system virtualization: a scalable, high-performance alternative to hypervisors," ACM SIGOPS Operating Systems Review 41(3):275-287, Mar. 2007.

Trusted Computing Group, "TPM Main, Part 1 Design Principles," Specification Version 1.2, Level 2 Revision 103, Jul. 9, 2007, 182 pages.

Trusted Computing Group, "TPM Main, Part 1 Design Principles," Specification Version 1.2, Revision 116, Mar. 1, 2011, 184 pages.

Trusted Computing Group, "TPM Main, Part 2 TPM Structures," Specification Version 1.2, Level 2 Revision 103, Jul. 9, 2007, 198 pages.

Trusted Computing Group, "TPM Main, Part 2 TPM Structures," Specification Version 1.2, Revision 116, Mar. 1, 2011, 201 pages.

Trusted Computing Group, "TPM Main, Part 3 Commands," Specification Version 1.2, Level 2 Revision 103, Jul. 9, 2007, 330 pages.

Trusted Computing Group, "TPM Main, Part 3 Commands," Specification Version 1.2, Revision 116, Mar. 1, 2011, 339 pages.

Van et al., "SLA-aware Virtual Resource Management for Cloud Infrastructures," IEEE Ninth International Conference on Computer and Information Technology, Oct. 11, 2009, pp. 357-362.

Wikipedia, "IEEE 802.11," Wikipedia, the Free Encyclopedia, page last modified Feb. 7, 2017, retrieved Feb. 13, 2017, https://en.wikipedia.org/wiki/IEEE_802.11, 9 pages.

Wikipedia, "IEEE 802.16," Wikipedia, the Free Encyclopedia, page last modified Nov. 21, 2016, retrieved Feb. 13, 2017, https://en.wikipedia.org/wiki/IEEE_802.16, 8 pages.

Wikipedia, "IEEE 802.21," Wikipedia, the Free Encyclopedia, page last modified Aug. 4, 2016, retrieved Feb. 13, 2017, https://en.wikipedia.org/wiki/IEEE_802.21, 3 pages.

Xavier et al., "Performance evaluation of container-based virtualization for high performance computing environments," Parallel, Distributed and Network-Based Processing (PDP), 2013 21st Euromicro International Conference, Feb. 2013, pp. 233-240.

Zhao et al., "Experimental study of virtual machine migration in support of reservation of cluster resources," Proceedings of the 2nd international workshop on Virtualization technology in distributed computing, Nov. 2007, pp. 1-8.

Third-Party Submission Under 37 CFR 1.290 dated Apr. 24, 2018, U.S. Appl. No. 15/283,017, filed Sep. 30, 2016, 10 pages.

IEEE 100, "The Authoritative Dictionary of IEEE Standards Terms", Seventh Edition, IEEE Standards Information Network, IEEE Press, Dec. 2000, 5 pages (pertinent pp. 1, 2, 155, 207, 1112).

European Office Action dated Nov. 6, 2018, Patent Application No. 16739357.8-1222, published May 9, 2018, 7 pages.

PC Plus, "How to turn an old netbook into a NAS drive," TechRadar, Mar. 1, 2010 [retrieved Feb. 5, 2019], https://www.techradar.com/news/networking/routers-storage/how-to-turn-an-old-netbook-into-a-nas-drive-670757, 12 pages.

Japanese Office Action dated Mar. 5, 2019, Patent Application No. 2017-566702, filed Mar. 22, 2017, 8 pages.

\* cited by examiner

HYBRIDIZED STORAGE OPERATION FOR REDUNDANCY CODED DATA STORAGE SYSTEMS

CROSS REFERENCE TO RELATED APPLICATIONS

This application incorporates by reference for all purposes the full disclosure of co-pending U.S. patent application Ser. No. 14/788,671, filed Jun. 30, 2015, entitled "SHIPPABLE NETWORK-ATTACHED DATA STORAGE DEVICE WITH UPDATEABLE ELECTRONIC DISPLAY," co-pending U.S. patent application Ser. No. 14/789,783, filed Jul. 1, 2015, entitled "GRID ENCODED DATA STORAGE SYSTEMS FOR EFFICIENT DATA REPAIR," co-pending U.S. patent application Ser. No. 14/741,409, filed Jun. 16, 2015, entitled "ADAPTIVE DATA LOSS MITIGATION FOR REDUNDANCY CODING SYSTEMS," co-pending U.S. patent application Ser. No. 15/083,115, filed concurrently herewith, entitled "LOCAL STORAGE CLUSTERING FOR REDUNDANCY CODED DATA STORAGE SYSTEM," and co-pending U.S. patent application Ser. No. 15/083,125, filed concurrently herewith, entitled "CYCLED CLUSTERING FOR REDUNDANCY CODED DATA STORAGE SYSTEMS."

BACKGROUND

Modern computer systems make extensive use of network computing and network data storage systems. Such use has proliferated in recent years, particularly in distributed or virtualized computer systems where multiple computer systems may share resources when performing operations and tasks associated with the computer systems. Such computer systems frequently utilize distributed data storage in multiple locations to store shared data items so that such data items may be made available to a plurality of consumers. The resources for network computing and network data storage are often provided by computing resource providers who leverage large-scale networks of computers, servers, and storage drives to enable customers to host and execute a variety of applications and web services. The usage of network computing and network data storage allows customers to efficiently and to adaptively satisfy their varying computing needs, whereby the computing and data storage resources that may be required by the customers are added or removed from a large pool provided by a computing resource provider as needed.

The proliferation of network computing and network data storage, as well as the attendant increase in the number of entities dependent on network computing and network data storage, have increased the frequency and amplitude of demand spikes, and in some cases, such demand spikes are not easily predicted. Database services optimized to scale for certain types of increased demand, such as payload size, may not necessarily be capable of handling demand on a different access, such as requested transaction rate.

BRIEF DESCRIPTION OF THE DRAWINGS

Various techniques will be described with reference to the drawings, in which.

DETAILED DESCRIPTION

Figure 1:
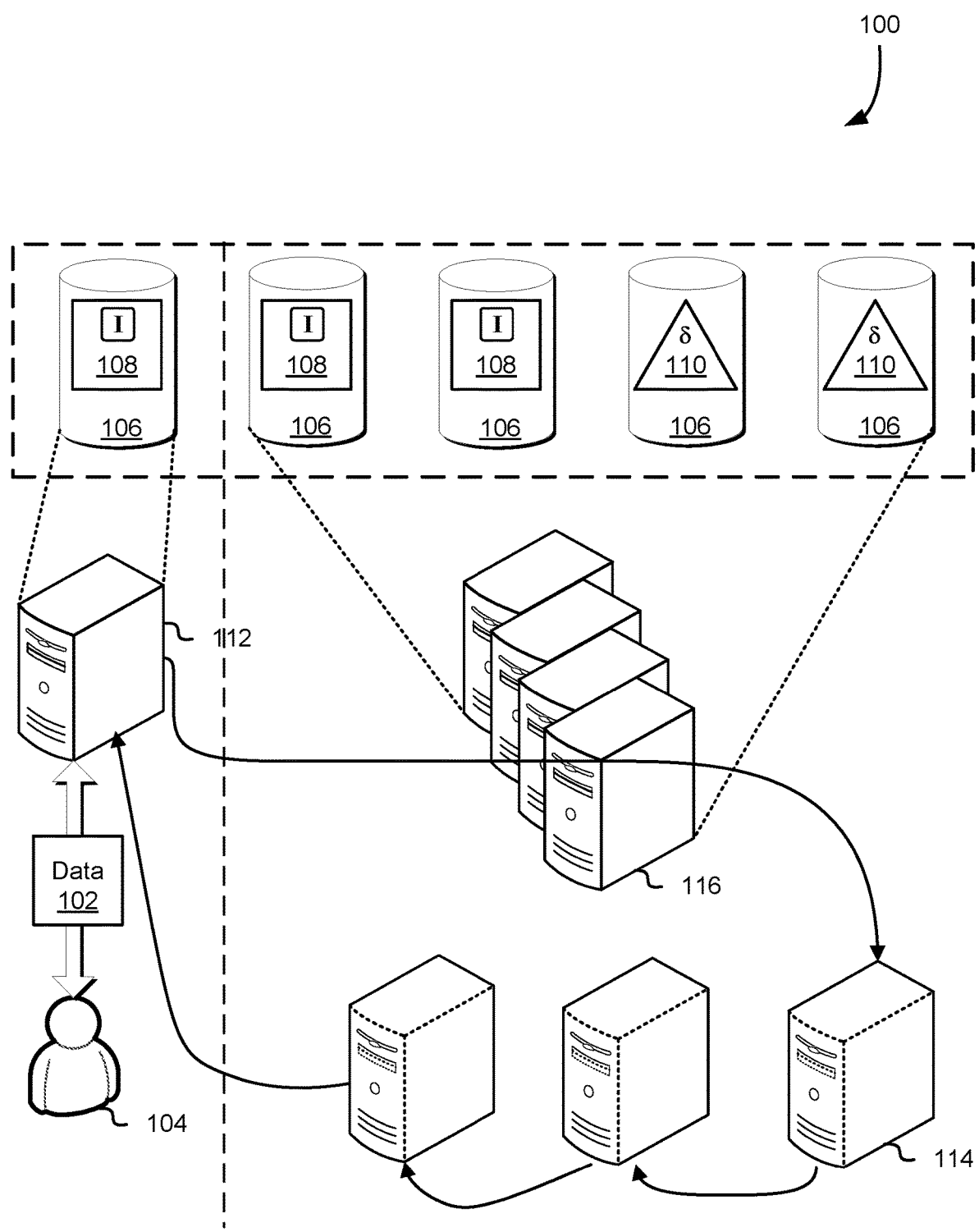
FIG. 1 illustrates an example environment in which a data storage system interfaces with data transfer devices to store a set of redundancy coded shards, in accordance with some embodiments.

In one example, data stored on a data storage system, is redundancy coded so as to improve durability, availability, and other aspects of the storage thereof. In connection with the storage of the data, one or more data transfer devices may be provisioned to locations external to the data storage system, such as customer locations, so as to acquire customer data for storage using the data storage system. The data transfer devices may be configured with persistent storage and other features, such as features described in further detail in the incorporated disclosures, so as to extend the capabilities of the data storage system on an ongoing basis and, in some cases, for an indeterminate length of time.

For example, the data transfer devices may be configured to be deployed to a customer location and store one or more shards of a plurality of shards. In some embodiments, the plurality of shards may be a bundle of redundancy coded (bundle encoded) shards, such that some of the bundle of shards is stored on durable storage of the data storage system and some of the bundle of the shards is resident on the data transfer device(s). In embodiments where the bundle of shards includes identity shards (having original forms of stored data) and derived/encoded shards (having redundancy coded forms of the stored data of the bundle), many configurations and allocations of shards with respect to the locations at which the shards are stored may be contemplated. As one example, some identity shards of a bundle may be allocated to the data transfer device(s), while the remaining shards of the bundle (including the remaining identity shards and the encoded/derived shards of the bundle) are stored on the durable storage of the data storage system. In this scenario, a customer or other entity may directly store customer data into the identity shards on the data transfer device, and, in connection with the storage, the encoded shard on the data storage system is updated to reflect the added customer data. The update may be performed as a result of the received data being transmitted over the network from the data transfer device, or after the data transfer device is shipped back to the location of the data storage system and ingested, according to techniques described in the incorporated disclosures. As may be contemplated, other types of redundancy coding, such as linear erasure coding, may be used (and may, in some cases, generate all derived/encoded shards, rather than some shards having an original form of the data (e.g., identity shards)).

In circumstances where the bundle in the preceding example has a quorum quantity of shards that is equal to or less than the number of the shards in the bundle that reside within the data storage system, after the update of the encoded (derived) shard, the data may be directly readable from the identity shard on the data transfer device or, in the alternative, by reconstruction of the customer data from the quorum of shards resident within the data storage system.

As may be contemplated, the identity shards of the bundle apportioned to the data storage system may be used to store additional data from, e.g., a different customer. After adding such additional data, the encoded shard need only be updated to retain the same durability characteristics as before the additional data was added, for all of the data represented in the bundle. Furthermore, the additional data may be directly readable from the identity shards stored in the data storage system, and in circumstances where the number of available shards of the bundle within the data storage system drops below the quorum quantity, the shards of the bundle resident on the data transfer devices may be "borrowed" to meet the quorum quantity and, thus, regenerate the data.

The data transfer devices may also transfer data to a second data storage system, such as a system with a different availability level or retrieval latency, and may stand in as a proxy for the second data storage system until data received by data transfer devices is transferred to the second data storage system. A given bundle of shards may thus span between two or more data storage systems, between data storage systems and data transfer devices, or any combination thereof, and still retain the various advantages of the selected redundancy coding or other encoding selecting and implemented according to the techniques described in further detail herein and in the incorporated disclosures.

The data transfer devices may be configured to mimic the operation of the data storage system without relying on the full capabilities of the data storage system. For example, the data transfer devices may be clustered to provide a certain level of storage, durability, computational capability, and the like, that would otherwise be available by provisioning a similar level of capability directly from the data storage system. Transfer of data and provision of capabilities may be transparent as between the clustered data transfer devices and the data storage system. In some examples, the quantity of and/or capabilities delivered by the clustered data transfer devices may be scaled up or down on demand, such as by requisition of additional data transfer devices to add to the cluster, or by removal of one or more data transfer devices from the cluster. The cluster may include a local version of interfaces, such as application programming interfaces or web service interfaces, that are similar to those provided by the data storage service, and thus facilitate transparent and/or flexible conversion and/or extension between capabilities provided directly by the cluster and those provided by the data storage system to which the cluster is associated.

Data may be stored in bundles of redundancy coded shards, which in some cases may overlap in such a fashion as to allow for various shards (and, in some embodiments, data transfer devices storing such shards) to be cycled on an ongoing basis. For example, two overlapping bundles of bundle-encoded shards may include a first bundle having two identity shards and an encoded shard, and a second bundle having two identity shards and an encoded shard, where one of the identity shards of the first bundle is the same identity shard as in the second bundle. A fill pattern may be implemented such that the identity shards accept data in a specified order. When a leading identity shard in the order becomes or approaches capacity (or some other event occurs), that identity shard is transferred (e.g., via an ingestion process), to a data storage system for durable storage.

While the data is being transferred (e.g., physically), the other two shards in the first bundle retain availability and durability of the data in that first identity shard, such that if the transfer fails or if the first identity shard is destroyed, it may simply be recreated from the other two shards in the first bundle. However, if the data is successfully transferred, the associated derived shard, as well as the first identity shard, are erased, and in some embodiments added to a new bundle that include the trailing identity shard of the second bundle (and thus the "new" identity shard is added to the back end of the fill order). While the first (leading) identity shard is unavailable, whether because it is in physical transit or because it is transferring data to the data storage system, after the triggering event, the next identity shard in the fill order becomes the leading identity shard (of the second bundle, in the provided example), and is used until a different event causes that identity shard to be transferred to the data storage system. The process repeats, in some cases indefinitely.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 illustrates an example environment in which a data storage system interfaces with data transfer devices to store a set of redundancy coded shards, in accordance with some embodiments.

A customer entity 104, via, e.g., a customer device, transacts data 102 with one or more data transfer devices 112 so as to cause the data 102 to be processed using one or more redundancy codes by, e.g., the data transfer device 112, a data storage system 116, or some combination thereof, to generate a plurality of shards 108, 110, to be stored on durable and/or persistent storage 106 associated with the data storage system 116 and/or the data transfer devices 112, according to one or more techniques described in the incorporated disclosures. For example, the data storage system 116, the data transfer device 112, or a combination thereof, may be configured to process incoming data 102 using a redundancy code, such as an erasure code, to generate the plurality of shards 108, 110. In this example, the plurality of shards may include identity shards 108 and encoded (derived) shards 110, which, as described in further detail herein and in the incorporated disclosures, may be part of a bundle of bundle-encoded shards. An example bundle encoding may generate, for a given set of input data (such as the data 102), a greater number of shards than a quorum quantity of the shards that is sufficient to recreate the original form of some or all of the data represented in the bundle.

The generated bundle of shards (which may, in some embodiments, be a part of a grid of shards, also described in further detail herein) may be considered, depending on the redundancy code used and the configured quorum quantity, to have two separate copies of a given piece of data stored in an identity shard. Specifically, one copy may be stored and directly retrievable in original form in an identity shard, and a second copy may be stored as some or all of the remainder of the shards as a bundle (e.g., recoverable by processing a quorum quantity of the remaining shards, using the redundancy code, so as to generate that data). This particular property may be used to apportion the shards of the bundle across multiple entities, so as to create a hybridized data storage system that utilizes the data storage system 116 and one or more data transfer devices 112, 114 that store disparate shards of the same bundle (e.g., the bundle is apportioned across multiple systems).

As discussed in further detail in the incorporated disclosures, the data transfer devices 112, 114 may be configured to receive and store data 102, such as on persistent storage of the data transfer devices 112, 114, for later transfer of data via an ingestion process into durable storage of a data storage system 116. The capabilities of the data transfer devices 112, 114 may also include an inherent level of durability and availability of data stored thereon that lend the data transfer devices 112, 114 to service not only as transfer devices, but also as devices that provide data storage, archival, and computational capabilities similar in operation to that of the data storage system 116 for a fixed or indeterminate length of time (and in some cases, such capabilities may be better attuned to the local environment of the customer entity 104 than that of the larger data storage system 116 the devices augment).

In some embodiments, in connection with the storage of the data 102, one or more data transfer devices 112 may be provisioned to locations external to the data storage system 116, such as customer locations associated with the customer entity 104, so as to acquire customer data 102 for storage using the data storage system 116. For example, the data transfer devices 112, 114 may be configured to be deployed to the customer location and store one or more shards 108 of a bundle of shards, such that some of the bundle of shards is stored on durable storage of the data storage system and some of the bundle of the shards is resident on the data transfer device(s). In embodiments where the bundle of shards includes identity shards 108 (having original forms of stored data) and derived/encoded shards 110 (having redundancy coded forms of the stored data of the bundle), many configurations and allocations of shards with respect to the locations at which the shards are stored, and by extension the systems and/or devices to which they are allocated, are contemplated.

As one example, some identity shards 108 of a bundle may be allocated to the data transfer device(s) 112, while the remaining shards of the bundle (including the remaining identity shards 108 and the encoded/derived shards 110 of the bundle) are stored on the durable storage of the data storage system. In this scenario, a customer entity may directly store customer data 102 into the identity shards 108 allocated to the data transfer device 112, and, in connection with the storage thereof, the encoded shard 110 on the data storage system 116 is updated to reflect the added customer data 102. The update may be performed as a result of the received data 102 being transmitted over a network, such as the Internet, from the data transfer device (e.g., in embodiments where the data transfer device is operably connected to the data storage system 116 in connection with arriving at the customer's location), or after the data transfer device 112 is shipped back to the location of the data storage system 116 and ingested, according to techniques described in the incorporated disclosures. In the latter example, the customer data 102 resident on the data transfer device is not redundant or durably replicated in the bundle until such time as the data has been ingested into the data storage system 116 and the derived shard(s) 110 are updated.

In circumstances where the bundle in the preceding example has a quorum quantity of shards that is equal to or less than the number of the shards in the bundle allocated to the data storage system 116, after the update of the encoded (derived) shard 110, the data may be directly readable from the identity shard 108 apportioned to the data transfer device 112 or, in the alternative, by reconstruction of the customer data 102 from a quorum of the remainder of the shards 108, 110 apportioned to the data storage system 116. As may be contemplated, the identity shards of the bundle apportioned to the data storage system may be used to store additional data from, e.g., a different customer, and in accordance with other bundle-encoding techniques described herein and in the incorporated disclosures. After adding such additional data, the encoded shard 110 need only be updated to retain the same durability characteristics as before the additional data was added, for all of the data represented in the bundle. Furthermore, the additional data may be directly readable from the identity shards 108 stored in the data storage system 116, and in circumstances where the number of available shards of the bundle within the data storage system 116 drops below the quorum quantity, the shards of the bundle resident on the data transfer devices 112 may be "borrowed" to meet the quorum quantity and, thus, regenerate the data.

In some embodiments, the data transfer devices 112 may also transfer data to a second data storage system, such as a system with a different availability level or retrieval latency, and may stand in as a proxy for the second data storage system until data received by data transfer devices is transferred to the second data storage system. A given bundle of shards may thus span between two or more data storage systems, between data storage systems and data transfer devices, or any combination thereof, and still retain the various advantages of the selected redundancy coding or other encoding selecting and implemented according to the techniques described in further detail herein and in the incorporated disclosures.

The bundle of shards may be extended to include additional identity shards 108, which may be apportioned to additional data transfer devices 112, such as if a given customer entity desires additional storage capacity or if the bundle is to be extended to include additional customer entities (at, e.g., different locations). Such expansion may be performed using null shard allocation and conversion and other techniques described in further detail in the incorporated disclosure. In some embodiments, the data transfer devices 112 may be cycled (e.g., 114) as requested or in connection with information indicating that the data transfer device 112 currently in place at a customer location is malfunctioning, full, etc. As may be contemplated, a given portion of customer data 102 transferred to a data transfer device can be treated as durably stored once the encoded shards 110 are updated to reflect the customer data 102. Accordingly, a different data storage device 112 may be sent to the customer location, and the existing data may be regenerated from the shards resident on the data storage system 116, and the resultant identity shard may be placed on the replacement data storage device 112.

Figure 2:
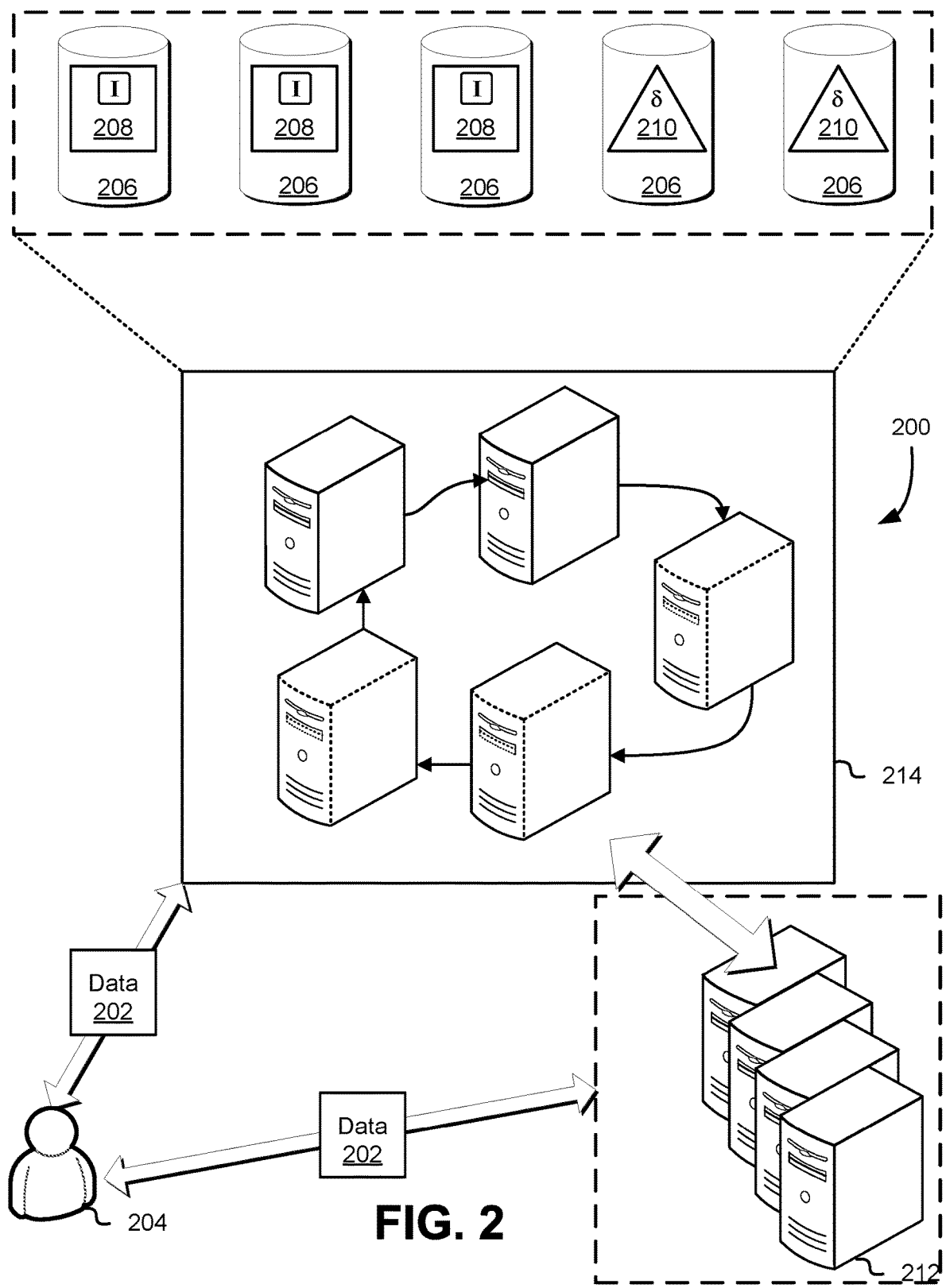
FIG. 2 illustrates an example environment in which a plurality of data transfer devices may be implemented to provide scalable data services, in accordance with some embodiments.

FIG. 2 illustrates an example environment in which a plurality of data transfer devices may be implemented to provide scalable data services, in accordance with some embodiments.

A plurality of data transfer devices, configured in a cluster 214, may be configured to mimic the operation of the data storage system 212 without relying on the full capabilities of the data storage system 212. For example, the cluster of data transfer devices 214 may be configured to provide a certain level of storage, durability, computational capability, and the like, that would otherwise be available by provisioning a similar level of capability directly from the data storage system 212. Transfer of data (e.g., customer data 202) and provisioning of capabilities may be transparent as between the clustered data transfer devices 214 and the data storage system 212.

In some examples, the quantity of and/or capabilities delivered by the clustered data transfer devices may be scaled up or down on demand, such as by requisition of additional data transfer devices to add to the cluster, or by removal of one or more data transfer devices from the cluster. Such scaling requests may be made by the customer entity 204 and directed to the data storage system 212, the cluster 214, or may be implied based on operational parameters of either the cluster 214 or the data storage system 212.

The cluster may include a local version of interfaces exposed to the customer entity 204, such as application programming interfaces (APIs) or web service interfaces, that are similar to those provided by the data storage system 212, and thus facilitate transparent and/or flexible conversion and/or extension between capabilities provided directly by the cluster 214 and those provided by the data storage system 212 to which the cluster is associated. As an example, the customer entity 204 may provide data 202 for archival or storage on durable and/or persistent storage 206 of the cluster 214, such as a bundle of redundancy coded shards 208, 210. Depending on how and to what extent the cluster 214 has been provisioned to store the data and/or process the data with the redundancy code, the customer entity 204 may submit data 202 to either the cluster itself 214 or the data storage system 212, and the data may be processed, transferred, and/or stored according to the level of provisioning, much as a data storage system 212 with multiple regions and/or availability zones provides a unified interface and transparent functionality with respect to the specific regions or availability zones in which the data is processed is stored. In other words, in the given example, the cluster of data storage devices 214 behaves and is treated as simply another region or portion of the larger data storage system 212, and may be scaled up and down according to request, demand, and the like.

The scaling of the capabilities of the cluster of data storage devices 214 may depend on the specific purpose or purposes provisioned from the cluster of data storage devices 214. For example, a customer associated with the customer entity 204 provisions the cluster of data storage devices 214 for a specific quantity of data storage space at a specified level of reliability and/or durability. As the customer's reliability, storage space, and/or durability requirements for the cluster changes, e.g., by a request of the customer via the customer entity 204, by a process of the cluster 214 itself (such as using a monitor or watch dog process that alerts the cluster 214, or the larger data storage system 212, when the provisioned limits are being approached or if a level of usage drops below a specified proportion of the provisioned limits), and/or by a command or other process of the data storage system 212 to which the cluster is associated, additional data transfer devices may be added to the cluster or unneeded capacity/capability may be removed from the device (e.g., by removing data transfer devices from the cluster, throttling the existing devices in the cluster, or remotely provisioning unneeded capability/capacity to other clusters, the data storage system 212, or the like). In circumstances where additional capability/capacity is needed in the short term, the larger data storage system 212 may be configured to provide the additional capability/capacity for a period of time, in some cases indefinitely, and/or until additional data transfer devices can be added to the cluster 214.

The cluster 214 may be configured to be addressable by an external entity—such as through its API, and by the customer entity 2014, the data storage system 212, or related processes, systems, or devices—such that any of the constituent data storage devices can serve as an external point of communication of the cluster 214 as a whole. For example, the cluster 214 may be configured as or in a similar fashion to that of a distributed hash ring. As another example, an external (or internal) load balancing method or system may be employed such that a unified external address identifier (e.g., an IP address or similar), can internally (or externally) be changeably directed to any of the constituent data transfer devices of the cluster to process the incoming request, or its eventual reply, for further processing (e.g., using the computational or other capabilities of the cluster).

As may be contemplated, the cluster 214 may be configured (and in some cases optimized) to provide one or more types of capability. Such capabilities may include one or more of the following: reliability, data storage capacity, physical size, computational capacity (e.g., as may be provided by graphics processors via OpenCL or GPGPU, central processing units, specialized ASICs or other specialized processors, network processors, cryptography processors, and the like), durability, throughput (either retrieval or storage), latency (either retrieval or storage), data bandwidth, electrical power consumption/efficiency, and the like. The cluster 214 may be optimized for one or more of these types of capabilities, but still be able to provide other types of capabilities for which it is not necessarily (or not primarily) optimized.

Figure 3:
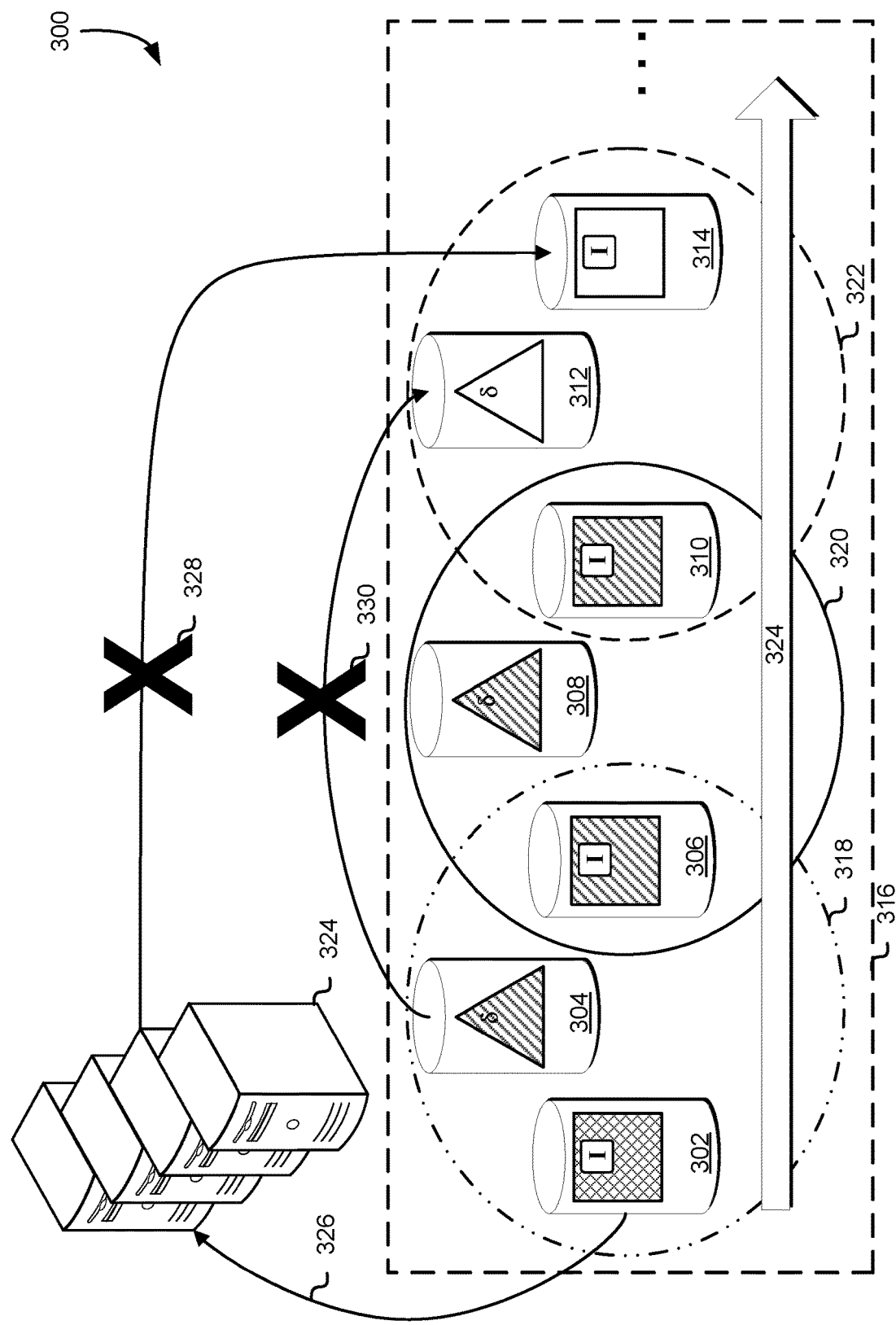
FIG. 3 illustrates an example environment in which a plurality of data transfer devices are cycled to improve local availability and/or durability, in accordance with some embodiments.

FIG. 3 illustrates an example environment in which a plurality of bundle-encoded shards, and in some cases, data transfer devices, are cycled to improve local availability and/or durability, in accordance with some embodiments.

An initial set of bundles of bundle-encoded shards 318, 320 is configured to overlap. In the illustrated example, the first bundle 318 includes a first identity shard 302, a first derived shard 304, and a second identity shard 306. The second bundle 320 comprises the second identity shard 306 (therefore overlapping the first bundle 318), a second derived shard 308, and a third identity shard 310. The bundle-encoding mechanism and processes are described in greater detail elsewhere herein, such as in FIGS. 7-10 below. While the illustrated example provides a 3:2 bundle-encoded set of shards (e.g., a quorum quantity of two out of a bundle of three shards), other encodings, including different bundle encodings (e.g., four identity shards to each encoded shard in a bundle, where the four identity shards are two pairs of shards) or grid encodings are contemplated hereby.

Initially, a system implementing the cycled storage pattern processes data storage requests such that the identity shards 302, 306, 310 are in a fill pattern 324 that includes specified order, illustrated in FIG. 3 as identity shards 302, 306, 310. In some embodiments, each shard 302, 304, 306, 308, 310 is associated with a different data transfer device, which may be provisioned by a data storage system, such as an archival data storage service, to provide one or more capabilities of the data storage system or other provisioning entity locally to a customer entity without necessitating a network connection between the provisioned data storage devices and the data storage system (or other provisioning entity). As described in FIG. 2 and elsewhere herein, such provisioned data storage devices may be referred to as a cluster. However, in other embodiments, the shards 302, 304, 306, 308, 310, etc. may not necessarily map one-to-one with the provisioned data transfer devices, and may instead map many-to-one or one-to-many.

In the illustrated example, when an event associated with identity shard 302 (shown with cross-hatching to illustratively denote inability or restriction from accepting further data) is detected by, e.g., a monitor associated with the first bundle 318, associated data transfer devices, the data storage system 324, or overall cluster 316, the cluster 316 is configured to perform several actions to cycle the layered bundles 318, 320. For example, the leading identity shard 302 that, e.g., caused the event, is transferred to the data storage system 324, such as by an ingestion process of the data storage system 324, so as to store (in some cases durably) the data of the first identity shard 302. In some cases, as described in further detail in the incorporated disclosures, the ingestion process may be initiated via a physical shipment and co-location of a data transfer device on which the identity shard 302 is stored, during which time the identity shard 302 is not available and therefore cannot directly service data retrieval requests for data stored data thereon. In such cases, the other two shards 304, 306 of the first bundle can be used to regenerate, via the redundancy code, the data retrieval requests, if the derived shard 304 has not yet been deleted.

The next identity shard 306 in the fill order is used to service further write requests and configured to accept data, in some cases after the receipt of the event but before the identity shard 302 is transferred to the data storage system 324. In some cases, the identity shard 306 (and in some cases, identity shard 310) may already have some data written to it, such as if there was a lapse of time between when the identity shard 304 is restricted from accepting further data and when it is transferred to the data storage system (or when an associated request to transfer the data is received). In such cases, it may be contemplated that, e.g., both derived shards 304 and 308 are updated in accordance. (As illustrated, the unidirectional hatching indicates an example where identity shard 306 is partially written to at the time when a request to transfer the data of restricted/full/unavailable identity shard 304 is received.)

The identity shard 302 and derived shard 304 of the bundle are deleted (or marked as unused/able to be overwritten) 328, 330, e.g., logically from the cluster 316, the layered bundle scheme, or in some cases, from the data transfer device on which they are stored, after the data of the identity shard 302 is successfully stored (e.g., durably, in some cases) on the receiving data storage system 324, which may in some cases be an archival data storage service. Once such storage is verified, in embodiments where the data transfer device is reused in the cluster and/or the layered bundle scheme, the data storage devices (now being clear of the shards 302, 304), are reinserted into the cluster, and the layering scheme is updated to include a new bundle 322 that includes "new" identity shard 314, "new" derived shard 312, and overlaps with bundle 320 by virtue of including the identity shard 310 of the bundle 320. Additionally, the "new" identity shard 314 is inserted at the trailing end of the fill order 324.

If a retrieval request for data in identity shard 302 is received by the cluster 316 after deletion 328, 330 of shards 302, 304, the data storage system 324 on which the data was stored (e.g., via the ingestion process) may be used to service the request. As illustrated, and as previously mentioned, upon occurrence/initiation/detection of the event causing the transfer of the data from identity shard 302 to the data storage system 324, the cluster 316 directs data storage requests to the next identity shard in the fill order 324, in some cases before performing any other substantive transfer actions.

As each identity shard fills in succession, the associated derived shard 308 is calculated in response. For example, as discussed in the incorporated disclosures and in FIGS. 7-10 below, if identity shard 310 is partially populated with data and thus identity shard 314 contains no data, the derived shard 312 may simply include a copy of the partially populated identity shard 310. Meanwhile, as identity shard 314 is populated, the derived shard 312 may be continuously updated to include processed data (e.g., by the implemented redundancy code(s)) that uses data from both the identity shard 310 and the identity shard 314 as inputs, thereby guaranteeing consistent redundancy of both the data within identity shard 310 and identity shard 314, even if an event causes 310 to be removed from the bundle (or otherwise becomes unavailable).

Events may include hardware, software, and/or cryptographic errors potentially affecting data stored in identity shards associated with such hardware, software, and/or cryptographic schemes, inability to accept additional data (e.g., reaching or approaching capacity, in some cases approaching a predetermined/prespecified threshold or percentage of capacity of the identity shard or its associated durable storage/data transfer device), request of a requestor (e.g., request of a customer entity associated with the cluster, request of the parent data storage system to, e.g., perform one or more computational actions on the data in the shard), time elapsed (e.g., since the data was stored in the identity shard, since the data was last accessed and/or modified, and the like), and the like. In some embodiments, the cycling of shards and/or data transfer devices may be triggered by the occurrence of more than just one event (and in some cases, require more than one event to occur before taking further action).

In some embodiments, data transfer devices used to store derived shards 304, 308, may be provisioned such that, after being cleared, may only be reprovisioned to store new derived shards (e.g., 312), rather than arbitrarily reprovisioned to accept any shard (e.g., either shard 312 or 314). Similarly, data transfer devices used to store identity shards 302, 306, 310, may only be reprovisioned for use to store new identity shards (e.g., 314). In such embodiments, the particular "derived" or "identity" data transfer devices may be optimized for storage and/or processing of such shards and/or data associated therewith, as, for example, data transfer devices used to store and/or generate derived shards may benefit from additional computational power relative to those optimized to store/process identity shards, and data transfer devices used to store and/or generate identity shards may benefit from more durable, available, reliable, or capacious hardware (e.g., storage media, storage controllers, additional redundancy coding, etc.).

Figure 4:
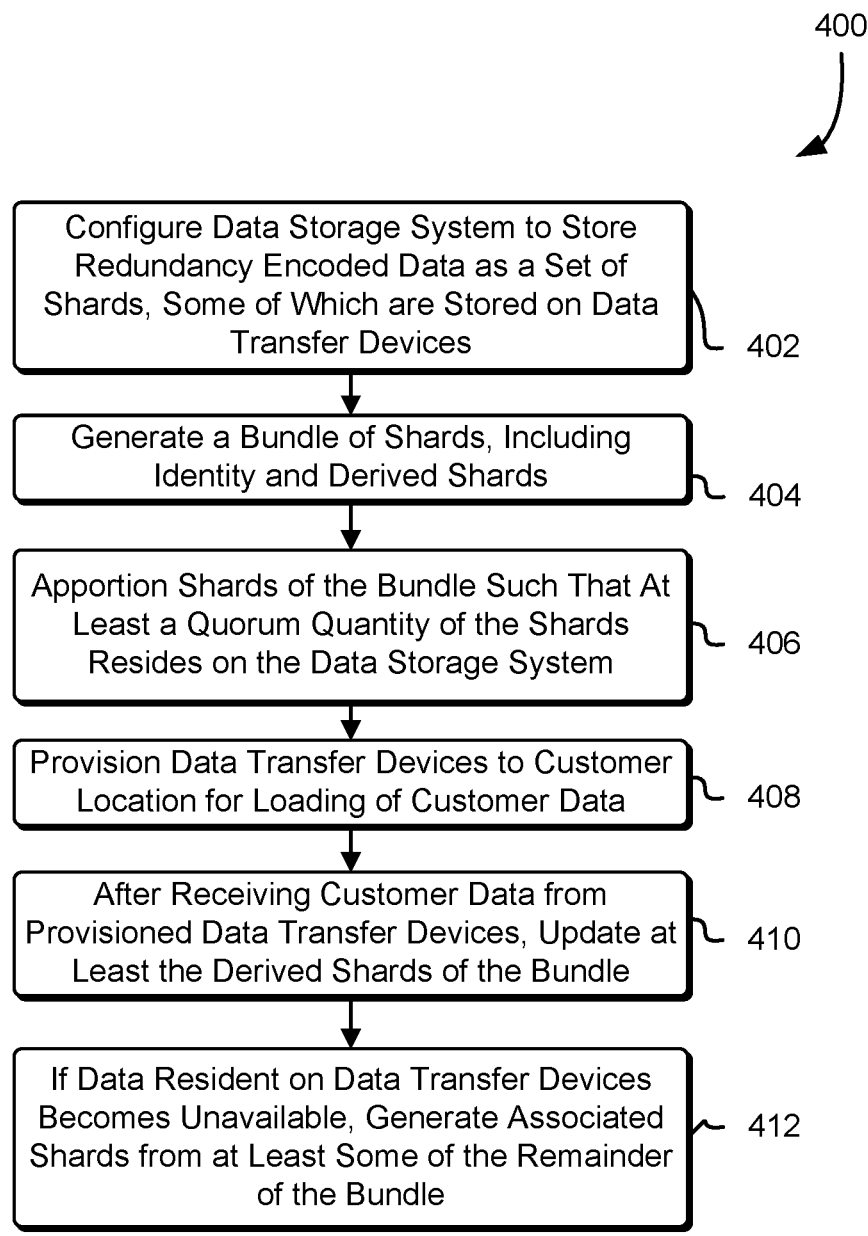
FIG. 4 illustrates an example process for storing redundancy coded data in a hybridized data storage system, in accordance with some embodiments.

FIG. 4 illustrates an example process for storing redundancy coded data in a hybridized data storage system, in accordance with some embodiments.

At step 402, a data storage system, such as that described in further detail herein and in the incorporated disclosures, is configured (e.g., via API) to store and apportion a set of redundancy coded shards such that some of the shards are allocated to data transfer devices that are external to the data storage system. The shard set may include null shards that allow for later expansion of the bundle to, e.g., include additional data transfer devices or additional data storage systems within the same bundle.

At step 404, the bundle of shards is generated according to the configuration calculated in step 402, and includes both identity and derived shards. In some embodiments, the data storage system centralizes the generation of the shards, while in other embodiments, the data transfer devices perform some or all of the computations to generate the shards (e.g., for those to be stored on the data transfer devices themselves).

At step 406, the generated shards are apportioned between the data transfer device and the data storage system such that more shards are allocated to the data storage system than to the external devices or systems, so as to prevent the data storage system from having too few shards to regenerate the data resident in the shards apportioned to the external data transfer device. After apportioning, at step 408, the data transfer devices are provisioned, e.g., to customer locations external (separate) from that of the data storage system, such as by physical shipment, so as to facilitate direct loading by a customer entity of customer data onto the data transfer devices.

At step 410, after receiving the customer data from the provisioned data transfer devices, e.g., over the network or via some other ingestion process as described in the incorporated references, the derived shards (e.g., those resident on the data storage system) are updated by the data storage system to reflect the change in the bundle's content (e.g., to include encoded forms of the customer data).

After steps 402-410, if data resident on the data transfer devices become unavailable, e.g., while the data transfer devices are in transit or malfunctions, the customer data may be regenerated from a quorum quantity of shards remaining in the bundle, such as those apportioned to the data storage system.

Figure 5:
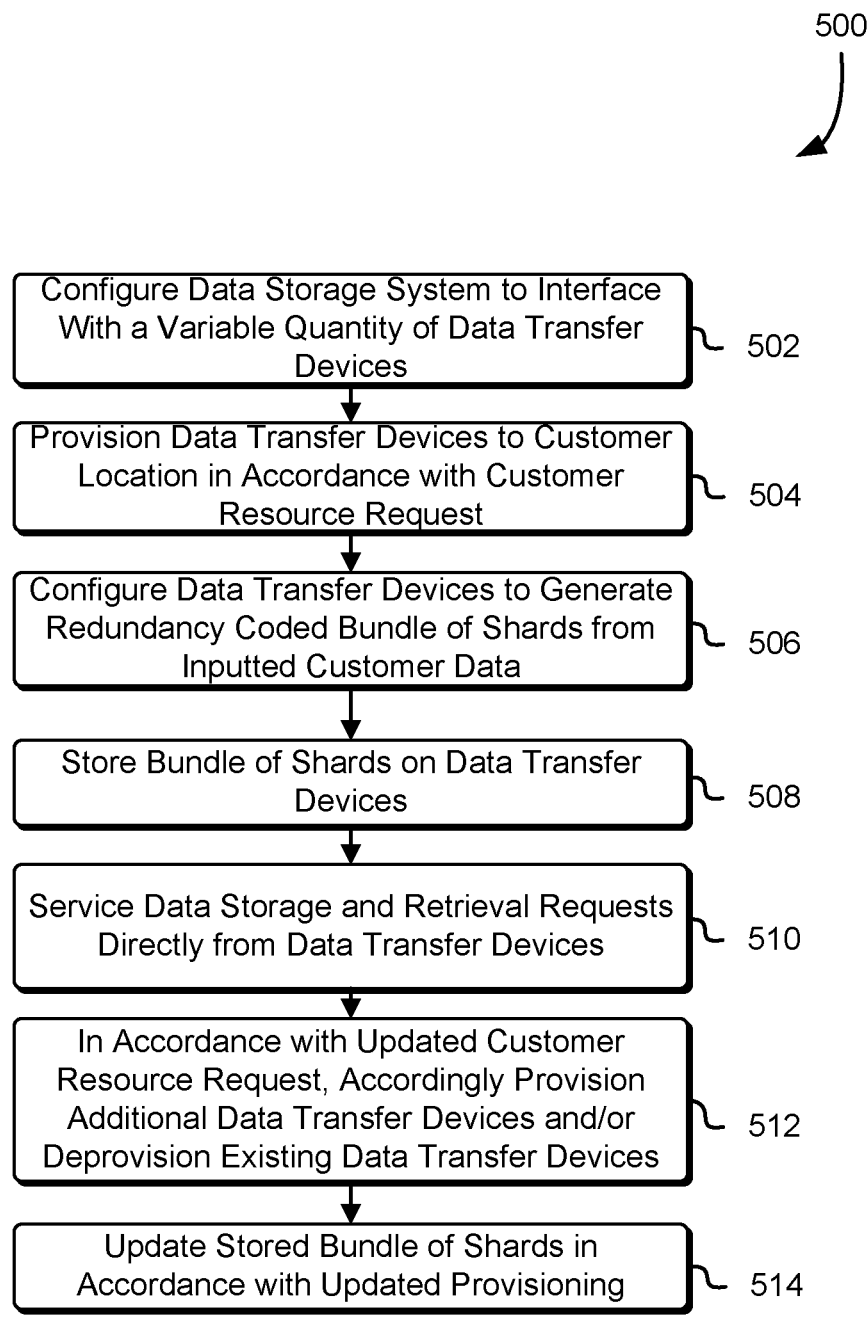
FIG. 5 illustrates an example process for scalably provisioning a plurality of data transfer devices to provide data-related functionality, in accordance with some embodiments.

FIG. 5 illustrates an example process for scalably provisioning a plurality of data transfer devices to provide data-related functionality, in accordance with some embodiments.

At step 502, a data storage system is configured to interface with a variable quantity of data transfer devices, such as incorporate such data transfer devices as an extension of one or more capabilities provided by the data storage system. At step 504, one or more data transfer devices are provisioned to a customer location (which may be external to that of the data storage system) in accordance with a resource request, e.g., of the customer.

At step 506, the data transfer devices are configured to directly interface and generate, in a manner similar to the manner of the data storage system, a plurality of bundle-encoded shards for storage on the provisioned data transfer devices, which may form a cluster that is, e.g., durable and highly available, as well as locally accessible to a given customer entity. The generated bundle of shards is stored across the cluster of data transfer devices in distributed fashion, e.g., to preserve durability characteristics of the encoded data, at step 508, and at step 510, requests for storage of further data and retrieval of stored and encoded data are received and serviced directly by the cluster of data transfer devices, rather than the data storage system. In some embodiments, as previously discussed, requests directed to the data storage system may be routed and serviced, in whole or in part, to the provisioned cluster of data transfer devices.

At step 512, in accordance with a new or updated customer resource request, additional data transfer devices are provisioned to the cluster (e.g., if additional storage, transactional, or computational capability is requested) or existing devices within the cluster are removed (e.g., if there is excess capacity), and in some embodiments, returned to the location of the data storage system. At step 514, if such provisioning or deprovisioning is accompanied by a change in shard allocation or bundle size to the cluster (e.g., on account of a change in the size of the cluster), the bundle of shards is updated by the data storage system or one or more nodes of the cluster to reflect the change in membership, content, etc. Such updates may include recalculation of one or more encoded shards within the bundle.

Figure 6:
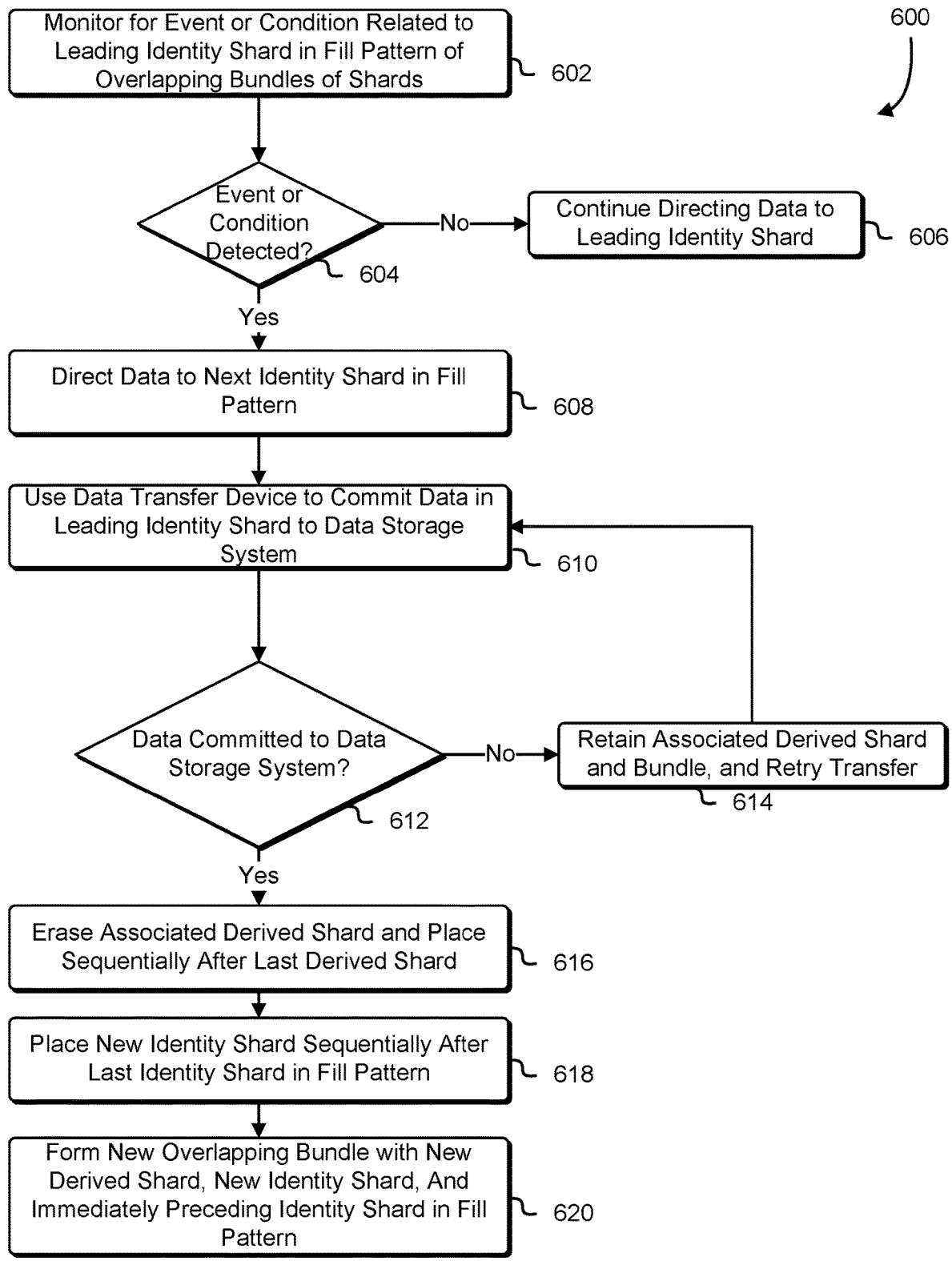
FIG. 6 illustrates an example process for cycling data transfer devices provisioned to an entity remote from a data storage system, in accordance with some embodiments.

FIG. 6 illustrates an example process for cycling data transfer devices provisioned to an entity remote from a data storage system, in accordance with some embodiments.

At step 602, an entity, such as a monitoring entity associated with an implementing cluster of data transfer devices, or a provisioning data storage system or archival data storage service, monitors at least a leading identity shard of a layered, cycled bundling scheme to which the first identity shard belongs, for one or more events or conditions as described in detail in at least FIG. 3 above. Such events may include the approaching of data capacity associated with the identity shard, hardware/software/cryptographic malfunctions associated with the hardware, and the like.

At decision point 604, if the event or condition is not detected, at step 606, data storage requests continue to be directed to and fulfilled by the leading identity shard in the fill order. Otherwise, at step 608, data storage requests are directed to and fulfilled by the next identity shard in the fill pattern, which in some embodiments is the other identity shard in the same bundle (and therefore the "leading" identity shard in an overlapping bundle).

At step 610, after data storage requests are directed to the next identity shard in the fill patter at step 608, a data transfer device is used to transfer and initiation commission, processing, and/or storage of the data of the associated leading identity shard on the data storage system. In some cases, step 610 is initiated via physical shipment and/or co-location of the data transfer device on which the identity shard is stored with an ingestor of the data storage system. Co-location, in this and other contexts used in this disclosure, includes the physical presence and proximity of devices or systems with each other, in some cases such that they are physically interconnected so as to transfer data, such as over a local area network. In other embodiments, such data is transmitted over a network to the data storage system, such as via the Internet, or other common network, while the data transfer device remains in place and physically remote from (e.g., not co-located with) the data storage system. In contexts within this disclosure where the data transfer device(s) is/are remote from the data storage system, they may be physically remote, as just mentioned, or logically remote, in the sense that the data transfer device(s) and the data storage system reside on different, unconnected networks (e.g., "air gapped"), thus rendering irrelevant the physical proximity thereof.

At decision point 612, if the data transferred at step 610 is not verified as successfully, and in some cases, durably stored on the receiving data storage system, the other shards in the same bundle remain available at step 614 to regenerate, via a redundancy code, the data of the identity shard in question, either to service retrieval requests associated therewith, or to recreate the identity shard (e.g., for replacement). In some embodiments, the transfer/storage/processing of step 610 is retried until it is successful.

However, if the data is successfully (e.g., durably, verifiably) committed to the data storage system at decision point 612, at step 616, the associated derived shard (e.g., data transfer device associated therewith) is deleted, and a new derived shard is placed (e.g., by the cluster) along with a new identity shard (step 618) to form a new overlapping bundle (step 620) that includes the new derived shard, the new identity shard, and the last identity shard of the fill pattern prior to step 618. The fill pattern is also updated to reflect the new identity shard, which is placed at the trailing end of the fill pattern. In some embodiments, the process 600 repeats indefinitely, and "old" identity shards are "recycled" into "new" identity shards (and "old" derived shards are recycled into "new" derived shards) on an ongoing, cycling basis.

Figure 7:
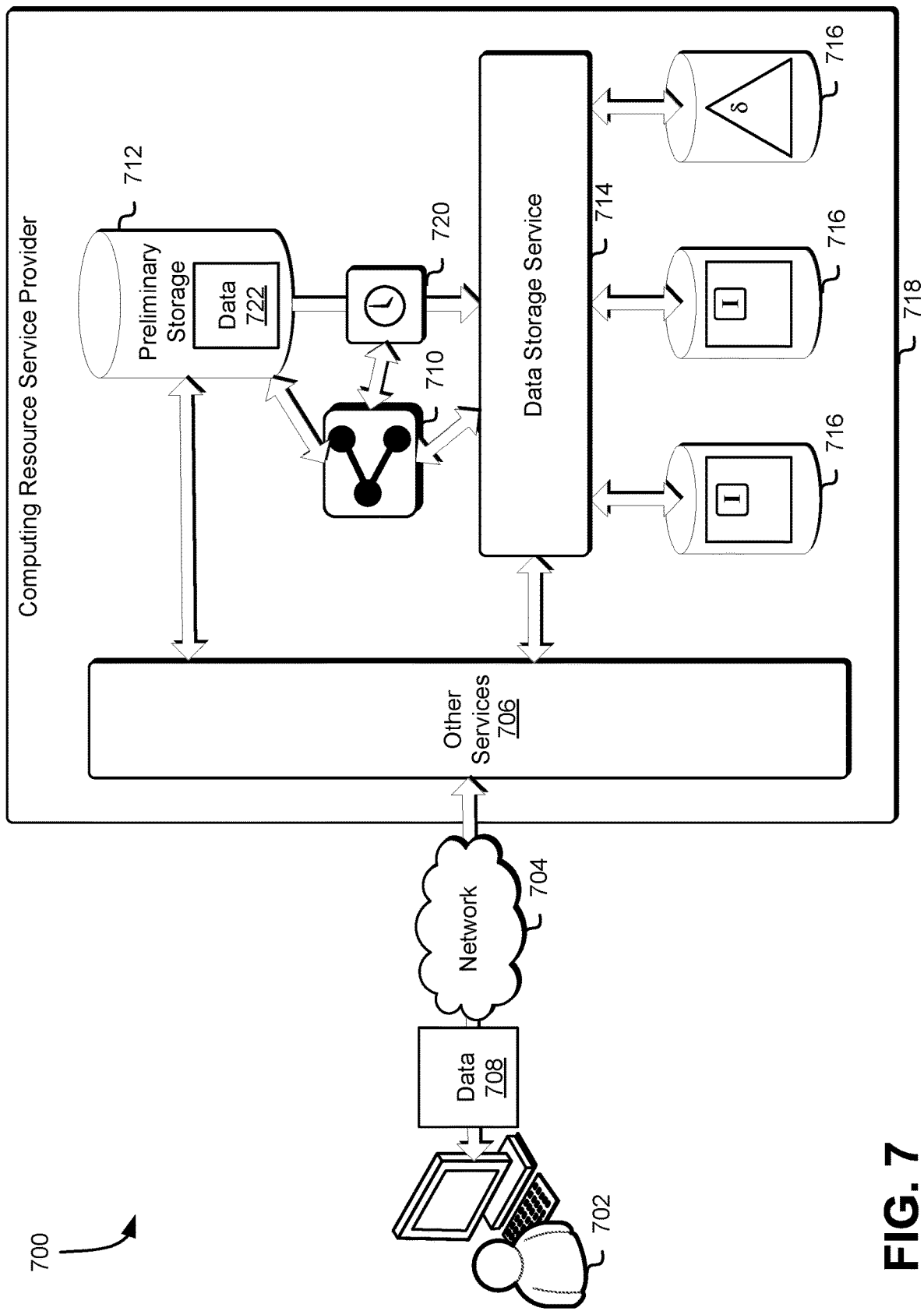
FIG. 7 illustrates an example environment in which a computing resource service provider implements a data storage service, such as a grid storage service, to process and store data transacted therewith, in accordance with some embodiments.

FIG. 7 illustrates an example environment in which a computing resource service provider implements a data storage service, such as a grid storage service, to process and store data transacted therewith, in accordance with some embodiments.

A customer, via a customer device 702, may connect via a network 704 to one or more services 706 provided by a computing resource service provider 718. In some embodiments, the computing resource service provider 718 may provide a distributed, virtualized, and/or datacenter environment within which one or more applications, processes, services, virtual machines, and/or other such computer system entities may be executed. In some embodiments, the customer may be a person, or may be a process running on one or more remote computer systems, or may be some other computer system entity, user, or process. The customer device 702 and the network 704 may be similar to that described in connection with at least FIG. 1 above.

The command or commands to connect to the computer system instance may originate from an outside computer system and/or server, or may originate from an entity, user, or process on a remote network location, or may originate from an entity, user, or process within the computing resource service provider, or may originate from a user of the customer device 702, or may originate as a result of an automatic process or may originate as a result of a combination of these and/or other such origin entities. In some embodiments, the command or commands to initiate the connection to the computing resource service provider 718 may be sent to the services 706, without the intervention of the user of the services 706. The command or commands to initiate the connection to the services 706 may originate from the same origin as the command or commands to connect to the computing resource service provider 718 or may originate from another computer system and/or server, or may originate from a different entity, user, or process on the same or a different remote network location, or may originate from a different entity, user, or process within the computing resource service provider, or may originate from a different user of the customer device 702, or may originate as a result of a combination of these and/or other such same and/or different entities.

The customer device 702 may request connection to the computing resource service provider 718 via one or more connections and, in some embodiments, via one or more networks 704 and/or entities associated therewith, such as servers connected to the network, either directly or indirectly. The customer device 702 that requests access to the services 706 may, as previously discussed, include any device that is capable of connecting with a computer system via a network, including at least servers, laptops, mobile devices such as smartphones or tablets, other smart devices such as smart watches, smart televisions, set-top boxes, video game consoles and other such network-enabled smart devices, distributed computer systems and components thereof, abstracted components such as guest computer systems or virtual machines and/or other types of computing devices and/or components. The network 704, also as previously discussed, may include, for example, a local network, an internal network, a public network such as the Internet, or other networks such as those listed or described herein. The network may also operate in accordance with various protocols such as those listed or described herein.

The computing resource service provider 718 may provide access to one or more host machines as well as provide access to services such as virtual machine (VM) instances, automatic scaling groups, or file-based database storage systems as may be operating thereon. The services 706 may connect to or otherwise be associated with one or more storage services such as those described herein (e.g., the data storage service 714). The storage services may be configured to provide data storage for the services 706. In an embodiment, the computing resource service provider 718 may provide direct access to the one or more storage services for use by users and/or customers of the computing resource service provider. The storage services may manage storage of data on one or more block storage devices and/or may manage storage of data on one or more archival storage devices such as, for example, magnetic tapes.

For example, the computing resource service provider 718 may provide a variety of services 706 to the customer device 702, which may in turn communicate with the computing resource service provider 718 via an interface, which may be a web service interface, application programming interface (API), user interface, or any other type of interface. The services 706 provided by the computing resource service provider 718 may include, but may not be limited to, a virtual computer system service, a block-level data storage service, a cryptography service, an on-demand data storage service, a notification service, an authentication service, a policy management service, an archival storage service, a durable data storage service such as the data storage service 714, and/or other such services. Each of the services 706 provided by the computing resource service provider 718 may include one or more web service interfaces that enable the customer device 702 to submit appropriately configured API calls to the various services through web service requests. In addition, each of the services may include one or more service interfaces that enable the services to access each other (e.g., to enable a virtual computer system of the virtual computer system service to store data in or retrieve data from the on-demand data storage service or the data storage service 714, and/or to access one or more block-level data storage devices provided by the block-level data storage service).

The block-level data storage service may comprise one or more computing resources that collectively operate to store data for a user using block-level storage devices (and/or virtualizations thereof). The block-level storage devices of the block-level data storage service may, for example, be operationally attached to virtual computer systems provided by a virtual computer system service to serve as logical units (e.g., virtual drives) for the computer systems. A block-level storage device may enable the persistent storage of data used or generated by a corresponding virtual computer system where the virtual computer system service may be configured to only provide ephemeral data storage.

The computing resource service provider 718 may also include an on-demand data storage service. The on-demand data storage service may be a collection of computing resources configured to synchronously process requests to store and/or access data. The on-demand data storage service may operate using computing resources (e.g., databases) that enable the on-demand data storage service to locate and retrieve data quickly, to allow data to be provided in response to requests for the data. For example, the on-demand data storage service may maintain stored data in a manner such that, when a request for a data object is retrieved, the data object can be provided (or streaming of the data object can be initiated) in a response to the request. As noted, data stored in the on-demand data storage service may be organized into data objects. The data objects may have arbitrary sizes except, perhaps, for certain constraints on size. Thus, the on-demand data storage service may store numerous data objects of varying sizes. The on-demand data storage service may operate as a key value store that associates data objects with identifiers of the data objects that may be used by the user to retrieve or perform other operations in connection with the data objects stored by the on-demand data storage service.

Note that, unless otherwise specified, use of expressions regarding executable instructions (also referred to as code, applications, agents, etc.) performing operations that instructions do not ordinarily perform unaided (e.g., transmission of data, calculations, etc.) in the context of describing disclosed embodiments denote that the instructions are being executed by a machine, thereby causing the machine to perform the specified operations.

The services 706 may produce data, such as data 708 received from the customer device 702, which may be stored 722 in the preliminary storage 712 as described above. In some embodiments, as previously mentioned, the data stored in the preliminary storage may be stored in unaltered form, such as in an identity shard. While the data is stored in the preliminary storage 712, the data 722 may be accessed by the services 706 (e.g., as a result of one or more API requests by the customer device 702) from the preliminary storage 712. After a determined period 270, such as described above in connection with FIG. 1, has passed and the data is migrated to a data storage service 714 provided by the computing resource service provider 718, the data may be accessed using the data storage service 714. In an embodiment where the data may be stored using redundancy encoding technique such as those described herein, the data storage service 714 may retrieve the data from any of the data volumes 716 and/or may reconstruct the data using the redundancy encoding techniques. The data volumes 716 may be magnetic tape, may be optical disks, or may be some other such storage media. As previously discussed and as further discussed herein, the data may be stored in identity shards that correspond individually to volumes, and may also be processed (using the redundancy encoding techniques) so as to create derived shards.

The data storage service 714 may store the data 722 in the preliminary storage 712 or may transmit a command that causes a different service (e.g., a block storage service or some other storage service such as those described herein) to store the data 722 in the preliminary storage 712. The data storage service 714 may also cause the data to be migrated from the preliminary storage 712 or may transmit a command that causes a different service to cause the data to be migrated from the preliminary storage 712. The data storage service 714 may also transmit a command or commands to cause a different service to perform other operations associated with making data objects eventually durable including, but not limited to, storing the data objects in the data shards, calculating derived shards, updating bundles, updating grids (i.e., updating horizontal, vertical, and other bundles of multiply bundled data), and/or other such operations.

In an embodiment, the preliminary storage 712 is a data storage volume such as, for example, a magnetic disk drive (e.g., a spinning disk drive or a solid state disk drive), computer system memory, magnetic tape, or some other optical storage device. In another embodiment, the preliminary storage 712 is a virtual and/or shared data storage volume that is mapped to a physical storage volume such as, for example, a disk drive, a solid state disk drive, computer system memory, magnetic tape, or some other optical storage device. As may be contemplated, the types of data storage volumes used for the preliminary storage 712 described herein are illustrative examples and other types of data storage volumes used for the preliminary storage 106 may be considered as within the scope of the present disclosure.

In an embodiment, the preliminary storage 712 is a plurality of storage devices that are used to redundantly store the data using techniques such as, for example, bundle encoding, grid encoding, or replicated storage. For example, the preliminary storage 712 may store the data by distributing the data to a plurality of data shards (e.g., putting a first portion of the data in a first data shard and a second portion of the data in a second data shard) and generating one or more derived shards based on those data shards. In another embodiment, the preliminary storage 112 is one or more storage devices that store redundant copies of the data as received. In yet another embodiment, the preliminary storage uses a combination of the storage techniques described herein by, for example, storing a single copy of the data for a first time period (e.g., thirty minutes), storing multiple copies of the data for a second time period (e.g., one day), using redundant storage techniques such as grid or bundle encoding to store the data for a third time period (e.g., thirty days), and then moving the data to more durable storage 716 using the data storage service 714 as described herein.

The set of data may be stored in the preliminary storage 712 in an unaltered form (e.g., not processed, compressed, indexed, or altered prior to storage). The set of data may also be stored in the preliminary storage 712 as, for example, original data (also referred to herein as an "identity shard") such as the original data shards described herein. In an embodiment, the set of data stored in the preliminary storage 712 is stored without indexing and without any redundancy encoding. In another embodiment, the set of data stored in the preliminary storage 712 is stored with null redundancy encoding (i.e., a redundancy encoding that maps the data to itself). The data in preliminary storage may be stored as raw data, or may be bundle-encoded, or may be grid-encoded, or may be stored using some other method.

In an embodiment, data can be migrated from preliminary storage to the data storage service 712 as a result of an event such as, for example, a request by a customer to store the data in the data storage service 714. Other events may also be used to cause the migration of the data from preliminary storage 712 to the data storage service 714 such as, for example, events generated by a process, module, service, or application associated with the customer or associated with a computing resource service provider. In an illustrative example, a block storage service may maintain data storage in preliminary storage for a running virtual machine instance and, upon termination of the instance, may generate an event to migrate some or all of the data from preliminary storage to durable storage. The triggering event that causes the migration of data from preliminary storage may also be combined with an elapsed time as described above so that, for example, data may be stored in preliminary storage until an event occurs, but the data may also be migrated from preliminary storage if no event occurs prior to the elapsed time. As may be contemplated, the criteria for initiating the migration from preliminary storage described herein are illustrative examples and other such criteria for initiating the migration from preliminary storage may be considered as within the scope of the present disclosure.

As used herein, the durability of a data object may be understood to be an estimate of the probability that the data object will not unintentionally become permanently irretrievable (also referred to herein as "unavailable"). This durability is an estimated probability and is generally expressed as a percentage (e.g., 99.9999 percent). This durability is based on assumptions of probabilities of certain failures (e.g., the AFR of drives used to store the data) and may be based on an average failure rate, a maximum failure rate, a minimum failure rate, a mean failure rate, or some other such failure rate. The durability may be based on a statistical average of the failure over a collection of drives when there are many different drives and/or when there are many different types of drives. The durability may also be based on historical measurements of the failure of drives and/or statistical sampling of the historical measurements of the failure of drives. The durability may also be correlated with the probability that a data object will not unintentionally become unavailable such as, for example, basing the durability on the probability that a data object will unintentionally become unavailable. As may be contemplated, the methods of determining durability of data described herein are merely illustrative examples and other such methods of determining durability of data may be considered as within the scope of the present disclosure.

In an embodiment, a separate service 710 can be configured to monitor the elapsed time 720 associated with the data objects in preliminary storage 712 and, based on a desired durability, cause the data storage service 714 to cause the data to be migrated from the preliminary storage 712 to the durable storage by, for example, transmitting a message to the data storage service. This separate service may operate asynchronously to enforce time limits for all such data stored in preliminary storage.

Figure 8:
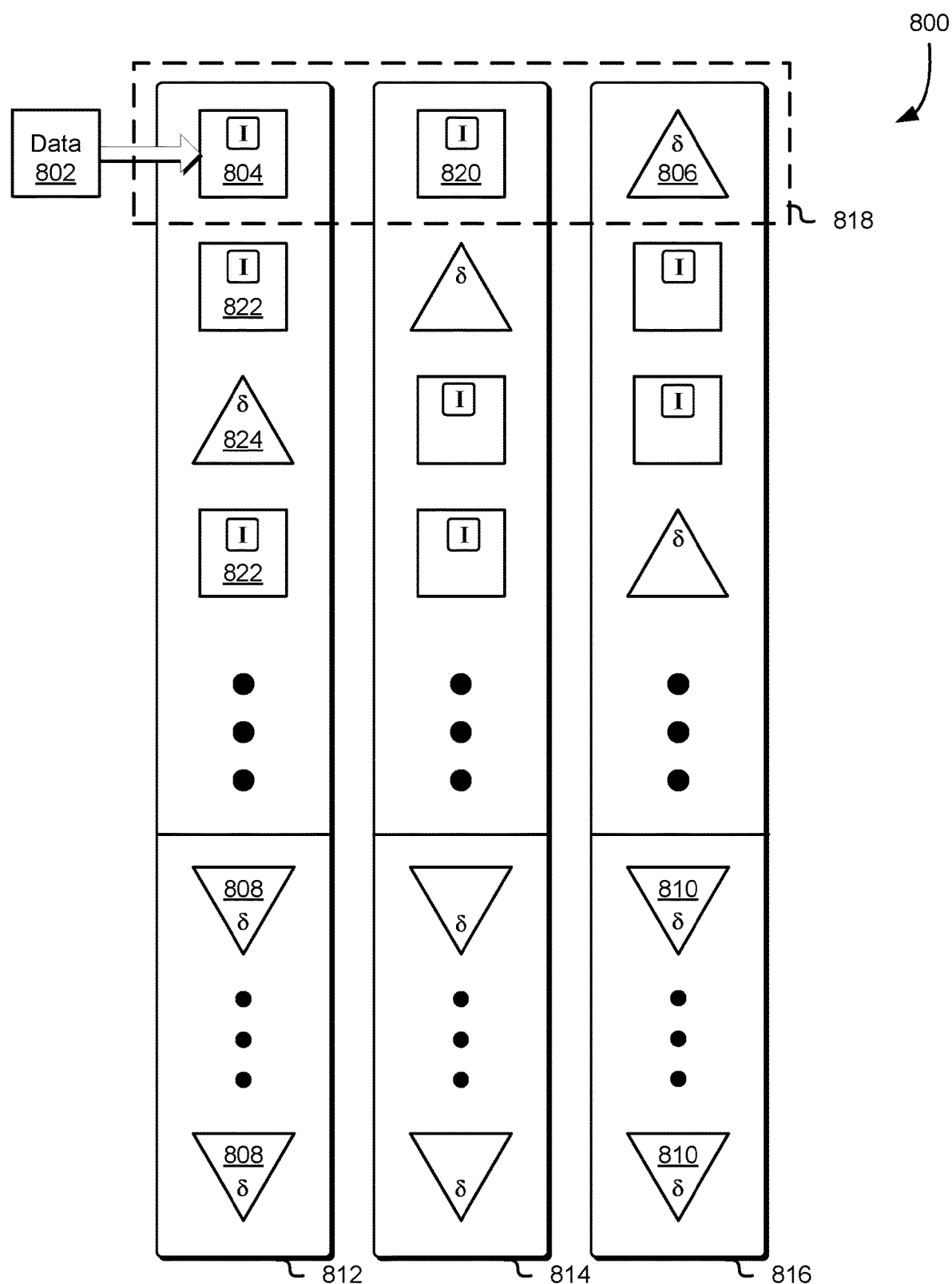
FIG. 8 illustrates an example environment where a redundancy encoding technique is applied to data stored in durable storage in accordance with at least one embodiment.

FIG. 8 illustrates an example environment 800 where a redundancy encoding technique is applied to data stored in durable storage as described in connection with FIG. 5 and in accordance with an embodiment. The redundancy encoding technique illustrated in FIG. 8 is an example of a grid encoding technique wherein each identity shard is part of a first set of one or more identity shards which may be bundled with one or more derived shards in a first group or bundle (i.e., in one dimension or direction) and each identity shard is also part of at least a second set of one or more identity shards which may be bundled with one or more other derived shards in a second bundle or group (i.e., in a second dimension or direction). As is illustrated in FIG. 8, a grid encoding technique is often implemented as a two-dimensional grid, with each shard being part of two bundles (i.e., both "horizontal" and "vertical" bundles). However, a grid encoding technique may also be implemented as a three-dimensional grid, with each shard being part of three bundles, or a four-dimensional grid, with each shard being part of four bundles, or as a larger-dimensional grid. Additional details of grid encoding techniques are described in U.S. patent application Ser. No. 14/789,783, filed Jul. 1, 2015, entitled "GRID ENCODED DATA STORAGE SYSTEMS FOR EFFICIENT DATA REPAIR," which is incorporated by reference herein.

In the example illustrated in FIG. 8, data 802 from preliminary storage is provided for storage in durable storage using a redundancy encoding technique with both horizontal derived shards and vertical derived shards. In the example illustrated in FIG. 8, a first datacenter 812 may contain data shards (denoted as a square shard with the letter "I"), horizontal derived shards (denoted as a triangular shard with the Greek letter "δ" or delta), and vertical derived shards (denoted as an inverted triangle with the Greek letter "δ") all of which may be stored on durable storage volumes within the first datacenter 812. A second datacenter 814, which may be geographically and/or logically separate from the first datacenter 812, may also contain data shards, horizontal derived shards, and/or vertical derived shards. A third datacenter 816, which may be geographically and/or logically separate from the first datacenter 812 and from the second datacenter 814, may also contain data shards, horizontal derived shards, and/or vertical derived shards. As illustrated in FIG. 8, each of the three datacenters may be a single vertical bundle. In an embodiment, each of the datacenters can include multiple vertical bundles. As may be contemplated, the number of datacenters illustrated in FIG. 8 and/or the composition of the datacenters illustrated in FIG. 8 are merely illustrative examples and other numbers and/or compositions of datacenters may be considered as within the scope of the present disclosure. The datacenters may be co-located or may be located in one or more separate datacenter locations.

In the example illustrated in FIG. 8, the data 802 may be copied to a data shard 804 and, as a result of the change to the data in the data shard 804, a horizontal derived shard 806 associated with the data shard 804 may be updated so that the horizontal derived shard 806 may be used to reconstruct the data shard 804 in the event of a loss of the data shard 804. In the example illustrated in FIG. 8, the three shards enclosed by the dotted line (e.g., the data shard 804, the data shard 820, and the horizontal derived shard 806) are a horizontal bundle 818. In this example, the data shard 820 is not affected by the changes to the data shard 804 but the horizontal derived shard 806 may need to be updated as a result of the changes to the data shard 804.

Also as a result of the change to the data in the data shard 804, one or more vertical derived shards 808 related to the data shard 804 may also be updated so that the vertical derived shards 808 may be used to reconstruct the data shard 804 in the event of a loss of the data shard 804 and the horizontal derived shard 806. In the example illustrated in FIG. 8, the shards in datacenter 812 form a vertical bundle. In this example, the other data shards 822 in the vertical bundle and/or the horizontal derived shards 824 in the vertical bundle are not affected by the changes to the data shard 804 but the vertical derived shards 808 may need to be updated as a result of the changes to the data shard 804. Finally, as a result of the change to the horizontal derived shard 806, one or more vertical derived shards 810 related to the horizontal derived shard 806 in the vertical bundle in datacenter 816 may also be updated so that the vertical derived shards 810 may be used to reconstruct the horizontal derived shard 806 in the event of a loss of the horizontal derived shard 806 and the data shard 804.

Figure 9:
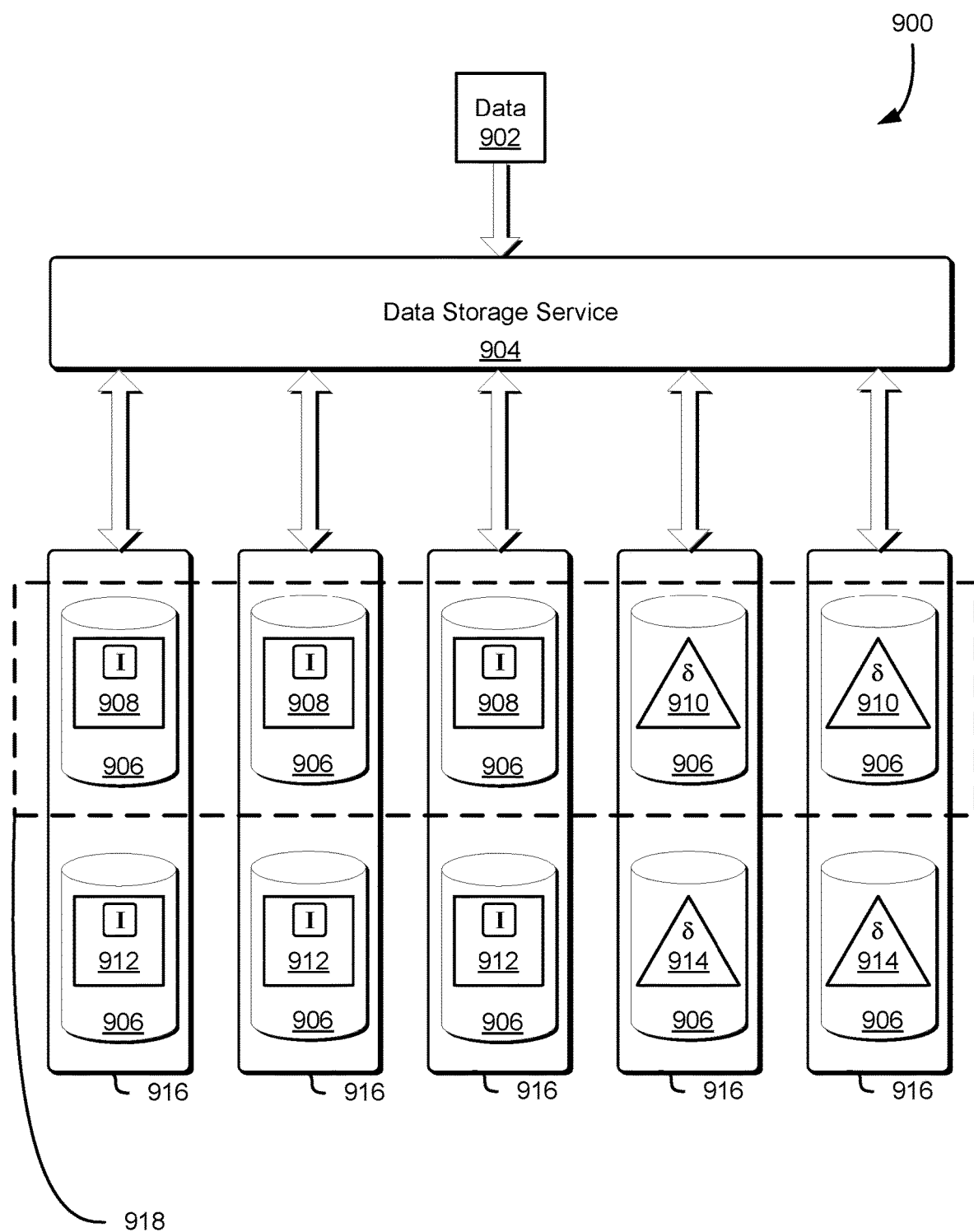
FIG. 9 illustrates an example environment where a redundancy encoding technique is applied to data stored in durable storage in accordance with at least one embodiment.

FIG. 9 illustrates an example environment 900 where a redundancy encoding technique is applied to data stored in durable storage as described herein and in accordance with at least one embodiment. The redundancy encoding technique illustrated in FIG. 9 is an example of a bundle encoding technique wherein one or more identity shards (also referred to herein as "data shards") may be bundled with one or more derived shards in a single group or dimension. Additional details of bundle encoding techniques are described in U.S. patent application Ser. No. 14/741,409, filed Jun. 16, 2015, entitled "ADAPTIVE DATA LOSS MITIGATION FOR REDUNDANCY CODING SYSTEMS," which is incorporated by reference herein.

Data 902 from preliminary storage may be sent to a data storage system 904 for redundant storage. The data 902 may be provided from the preliminary storage by any entity capable of transacting data with a data storage system, such as over a network (including the Internet). Examples include physical computing systems (e.g., servers, desktop computers, laptop computers, thin clients, and handheld devices such as smartphones and tablets), virtual computing systems (e.g., as may be provided by the computing resource service provider using one or more resources associated therewith), services (e.g., such as those connecting to the data storage system 904 via application programming interface calls, web service calls, or other programmatic methods), and the like.

The data storage system 904 may be any computing resource or collection of such resources capable of processing data for storage, and interfacing with one or more resources to cause the storage of the processed data. Examples include physical computing systems (e.g., servers, desktop computers, laptop computers, thin clients, and handheld devices such as smartphones and tablets), virtual computing systems (e.g., as may be provided by the computing resource service provider using one or more resources associated therewith), services (e.g., such as those connecting to the data storage system 904 via application programming interface calls, web service calls, or other programmatic methods), and the like. In some embodiments, the resources of the data storage system 904, as well as the data storage system 904 itself, may be one or more resources of a computing resource service provider, such as that described in further detail below. In some embodiments, the data storage system 904 and/or the computing resource service provider provides one or more archival storage services and/or data storage services, such as those described herein, through which a client entity may provide data such as the data 902 for storage in preliminary storage and/or the data storage system 904.

Data 902 may include any quantity of data in any format. For example, the data 902 may be a single file or may include several files. The data 902 may also be encrypted by, for example, a component of the data storage system 904 after the receipt of the data 902 in response to a request made by a customer of the data storage system 904 and/or by a customer of computing resource service provider.

The data storage system 904 may sort one or more identity shards according to one or more criteria (and in the case where a plurality of criteria is used for the sort, such criteria may be sorted against sequentially and in any order appropriate for the implementation). Such criteria may be attributes common to some or all of the archives, and may include the identity of the customer, the time of upload and/or receipt (by the data storage system 904), archive size, expected volume and/or shard boundaries relative to the boundaries of the archives (e.g., so as to minimize the number of archives breaking across shards and/or volumes), and the like. As mentioned, such sorting may be performed so as to minimize the number of volumes on which any given archive is stored. Such techniques may be used, for example, to optimize storage in embodiments where the overhead of retrieving data from multiple volumes is greater than the benefit of parallelizing the retrieval from the multiple volumes. Information regarding the sort order may be persisted, for example, by the data storage system 904, for use in techniques described in further detail herein.

As previously discussed, in some embodiments, one or more indices may be generated in connection with, for example, the order in which the archives are to be stored, as determined in connection with the sorting mentioned immediately above. The index may be a single index or may be a multipart index, and may be of any appropriate architecture and may be generated according to any appropriate method. For example, the index may be a bitmap index, dense index, sparse index, or a reverse index. Embodiments where multiple indices are used may implement different types of indices according to the properties of the identity shard to be stored via the data storage system 904. For example, a data storage system 904 may generate a dense index for archives over a specified size (as the size of the index itself may be small relative to the number of archives stored on a given volume), and may also generate a sparse index for archives under that specified size (as the ratio of index size to archive size increases).

The data storage system 904 is connected to or includes one or more volumes 906 on which archives or identity shards may be stored. The generated indices for the archives may also be stored on the one or more volumes 906. The volumes 906 may be any container, whether logical or physical, capable of storing or addressing data stored therein. In some embodiments, the volumes 906 may map on a one-to-one basis with the data storage devices on which they reside (and, in some embodiments, may actually be the data storage devices themselves). In some embodiments, the size and/or quantity of the volumes 906 may be independent of the capacity of the data storage devices on which they reside (e.g., a set of volumes may each be of a fixed size such that a second set of volumes may reside on the same data storage devices as the first set). The data storage devices may include any resource or collection of resources, such as those of a computing resource service provider, that are capable of storing data, and may be physical, virtual, or some combination of the two.

As previously described, one or more indices may, in some embodiments, be generated for each volume of the plurality of volumes 906, and in such embodiments, may reflect the archives stored on the respective volume to which it applies. In embodiments where sparse indices are used, a sparse index for a given volume may point to a subset of archives stored or to be stored on that volume, such as those archives which may be determined to be stored on the volume based on the sort techniques mentioned previously. The subset of volumes to be indexed in the sparse index may be selected on any appropriate basis and for any appropriate interval. For example, the sparse index may identify the archives to be located at every x blocks or bytes of the volume (e.g., independently of the boundaries and/or quantity of the archives themselves). As another example, the sparse index may identify every nth archive to be stored on the volume. As may be contemplated, the indices (whether sparse or otherwise), may be determined prior to actually storing the archives on the respective volumes. In some embodiments, a space may be reserved on the volumes so as to generate and/or write the appropriate indices after the archives have been written to the volumes 906.

In some embodiments, the sparse indices are used in connection with information relating to the sort order of the archives so as to locate archives without necessitating the use of dense indices, for example, those that account for every archive on a given volume. Such sort order-related information may reside on the volumes 906 or, in some embodiments, on an entity separate from the volumes 906, such as in a data store or other resource of a computing resource service provider. Similarly, the indices may be stored on the same volumes 906 to which they apply, or, in some embodiments, separately from such volumes 906.

The archives may be stored, bit for bit (e.g., the "original data" of the archives), on a subset of the plurality of volumes 906. Also as mentioned, appropriate indices may also be stored on the applicable subset of the plurality of volumes 906. The original data of the archives is stored as a plurality of shards across a plurality of volumes, the quantity of which (either shards or volumes, which in some cases may have a one to one relationship) may be predetermined according to various factors, including the number of total shards that may be used to reconstruct the original data using a redundancy encode. In some embodiments, the number of volumes used to store the original data of the archives is the quantity of shards that may be used to reconstruct the original data from a plurality of shards generated by a redundancy code from the original data. As an example, FIG. 9 illustrates five volumes, three of which contain original data archives 908 and two of which contain derived data 910, such as redundancy encoded data. In the illustrated example, the redundancy code used may require any three shards to regenerate original data, and therefore, a quantity of three volumes may be used to write the original data (even prior to any application of the redundancy code).

The volumes 906 bearing the original data archives 908 may each contain or be considered as shards unto themselves. For example, the data 902 from preliminary storage may be copied directly only to a volume if, as described herein, it is stored in preliminary storage as an identity shard. In embodiments where the sort order-related information and/or the indices are stored on the applicable volumes 906, they may be included with the original data of the archives and stored therewith as shards, as previously mentioned. In the illustrated example, the original data archives 908 are stored as three shards (which may include the respective indices) on three associated volumes 906. In some embodiments, the original data archives 908 (and, in embodiments where the indices are stored on the volumes, the indices) are processed by an entity associated with, for example, the archival storage service, using a redundancy code, such as an erasure code, so as to generate the remaining shards, which contain encoded information rather than the original data of the original data archives. The original data archives 908 may be processed using the redundancy code at any time after being sorted, such as prior to being stored on the volumes, contemporaneously with such storage, or after such storage.

Such encoded information may be any mathematically computed information derived from the original data, and depends on the specific redundancy code applied. As mentioned, the redundancy code may include erasure codes (such as online codes, Luby transform codes, raptor codes, parity codes, Reed-Solomon codes, Cauchy codes, Erasure Resilient Systematic Codes, regenerating codes, or maximum distance separable codes) or other forward error correction codes. In some embodiments, the redundancy code may implement a generator matrix that implements mathematical functions to generate multiple encoded objects correlated with the original data to which the redundancy code is applied. In some of such embodiments, an identity matrix is used, wherein no mathematical functions are applied and the original data (and, if applicable, the indices) are allowed to pass straight through. In such embodiments, it may be therefore contemplated that the volumes bearing the original data (and the indices) may correspond to objects encoded from that original data by the identity matrix rows of the generator matrix of the applied redundancy code, while volumes bearing derived data correspond to other rows of the generator matrix. In the example illustrated in FIG. 9, the five volumes 906 include three volumes that have shards (e.g., identity shards) corresponding to the original data of the original data archives 908, while two have encoded shards corresponding to the derived data 910 (also referred to herein as "derived shards"). As illustrated in FIG. 9, the three original data archives 908, and the two encoded shards corresponding to the derived data 910 form a bundle 918 (denoted by the dashed line). In this example, the applied redundancy code may result in the data being stored in a "3:5" scheme, wherein any three shards of the five stored shards are required to regenerate the original data, regardless of whether the selected three shards contain the original data or the derived data.

In some embodiments, if one of the volumes 906 or a shard stored thereon is detected as corrupt, missing, or otherwise unavailable, a new shard may be generated using the redundancy code applied to generate the shard(s) in the first instance. The new shard may be stored on the same volume or a different volume, depending, for example, on whether the shard is unavailable for a reason other than the failure of the volume. The new shard may be generated by, for example, the data storage system 904, by using a quantity of the remaining shards that may be used to regenerate the original data (and the index, if applicable) stored across all volumes, regenerating that original data, and either replacing the portion of the original data corresponding to that which was unavailable (in the case that the unavailable shard contains original data), or reapplying the redundancy code so as to provide derived data for the new shard.

As previously discussed, in some embodiments, the new shard may be a replication of the unavailable shard, such as may be the case if the unavailable shard includes original data of the archive(s). In some embodiments, the new shard may be selected from a set of potential shards as generated by, for example, a generator matrix associated with the redundancy code, so as to differ in content from the unavailable shard (such as may be the case if the unavailable shard was a shard generated from the redundancy code, and therefore contains no original data of the archives). As discussed throughout this disclosure, the shards and/or volumes may be grouped and/or layered.

In some embodiments, retrieval of an archive stored in accordance with the techniques described herein may be requested by a client entity under control of a customer of the computing resource service provider and/or the archival storage service provided therefrom, as described in further detail throughout this disclosure. In response to the request, the data storage system 904 may locate, based on information regarding the sort order of the archives as stored on the volumes 906, the specific volume on which the archive is located. Thereafter, the index or indices may be used to locate the specific archive, whereupon it may be read from the volume and provided to a requesting client entity. In embodiments where sparse indices are employed, the sort order information may be used to locate the nearest location (or archive) that is sequentially prior to the requested archive, whereupon the volume is sequentially read from that location or archive until the requested archive is found. In embodiments where multiple types of indices are employed, the data storage system 904 may initially determine which of the indices includes the most efficient location information for the requested archive based on assessing the criteria used to deploy the multiple types of indices in the first instance. For example, if archives under a specific size are indexed in a sparse index and archives equal to or over that size are indexed in a parallel dense index, the data storage system 904 may first determine the size of the requested archive, and if the requested archive is larger than or equal to the aforementioned size boundary, the dense index may be used so as to more quickly obtain the precise location of the requested archive.

In some embodiments, the volumes 906 may be grouped such that each given volume has one or more cohorts 916. In such embodiments, a volume set (e.g., all of the illustrated volumes 906) may be implemented such that incoming archives to be stored on the volumes are apportioned to one or more failure-decorrelated subsets of the volume set. The failure-decorrelated subsets may be some combination of the volumes 906 of the volume subset, where the quantity of volumes correlates to a number of shards required for the implemented redundancy code. In the illustrated example, the overall volume set may comprise two failure-decorrelated subsets (volumes in a horizontal row) where a given constituent volume is paired with a cohort (e.g., the cohort 916). In some embodiments, the incoming archives are apportioned to one or more of the cohorts in the failure-decorrelated subset according to, for example, a predetermined sequence, based on one or more attributes of the incoming archives, and the like.

The illustrated example shows, for clarity, a pair-wise cohort scheme, though other schemes are contemplated as within scope of this disclosure, some of which are outlined in greater detail herein. In the illustrated example, some of the volumes of the volume set store original data of incoming archives (e.g., original data archives 908 and/or original data archives 912), while others store derived data (e.g., derived data 910 and derived data 914). The data storage system 904 may implement a number of failure-decorrelated subsets to which to store the incoming archives, and in the pair-wise scheme pictured, the volumes used for a given archive may differ based on some arbitrary or predetermined pattern. As illustrated, some archives may be apportioned to volumes of a given cohort that are assigned to one pattern, or failure-decorrelated subset as shown by original data archives 908 and derived data 910, while others are apportioned to volumes in a different pattern as shown by original data archives 912 and derived data 914. The patterns, as mentioned, may be arbitrary, predefined, and/or in some cases, sensitive to attributes of the incoming data. In some embodiments, patterns may not be used at all, and the member volumes of a given failure-decorrelated subset may be selected randomly from a pool of volumes in the volume set.

Figure 10:
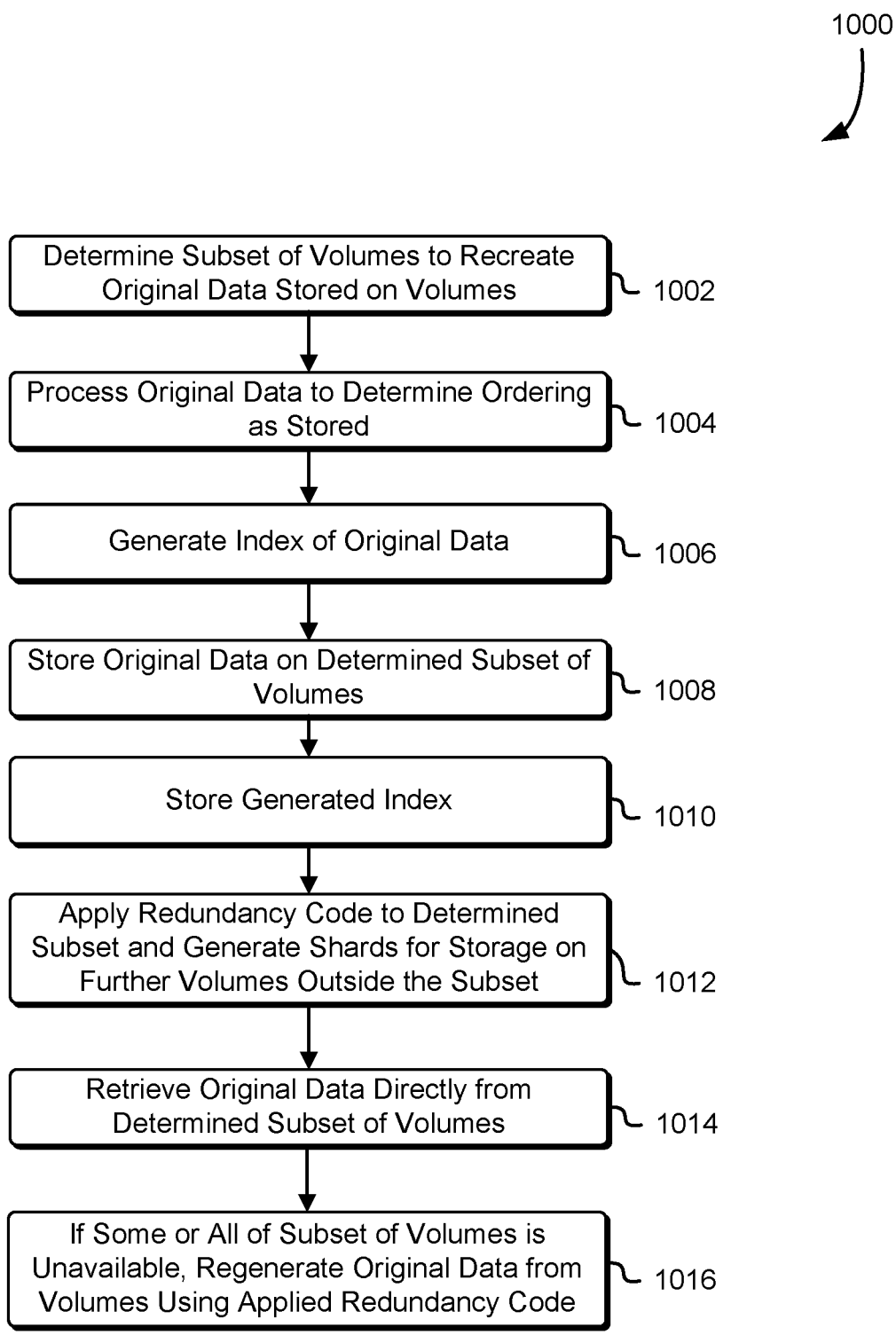
FIG. 10 illustrates an example process for applying redundancy encoding techniques to data stored in durable storage in accordance with at least one embodiment.

FIG. 10 illustrates an example process 1000 for applying redundancy encoding techniques to data stored in durable storage as described herein in connection with FIG. 7 and in accordance with at least one embodiment. The example process 1000 illustrated in FIG. 10 illustrates the processing, indexing, storing, and retrieving of data stored on a data storage system. The data may be retrieved from preliminary storage as described herein. The example process 1000 illustrated in FIG. 10 may be used in conjunction with a grid encoding technique such that described in connection with FIG. 8, in conjunction with a bundle encoding technique such as that described in connection with FIG. 9, or with some other redundancy encoding technique. A data storage service such as the data storage service described herein may perform the example process 1000 illustrated in FIG. 10.

At step 1002, a resource of a data storage system, such as that implementing a redundancy code to store archives, determines which subset (e.g., quantity) of a plurality of volumes that may be used to recreate the original data to be stored, based on, for example, a redundancy code to be applied to the archives. For example, in accordance with the techniques described above in connection with FIG. 9, such information may be derived from predetermining the parameters of an erasure code with a specified ratio of shards that may be used to regenerate the original data from which they derive to the total number of shards generated from the application of the erasure code.

At step 1004, original data, such as original data of archives received from customers of, for example, a data storage system or a computing resource service provider as described in further detail herein, is sorted by, for example, the data storage system or associated entity. For example, the sort order may be implemented on one or more attributes of the incoming data.

At step 1006, one or more indices, such as sparse indices, are generated by, for example, the data storage system, for the original data. For example, there may be more than one index for a given volume, and such parallel indices may be of different types depending on the nature of the archives and/or original data being stored.

At step 1008, the original data is stored, for example, by the data storage system, on the subset of volumes determined in connection with step 1002, and in the order determined in step 1004. Additionally, at step 1010, the index generated in step 1006 is stored, for example, by the data storage system, on an appropriate entity. For example, the index may be stored as part of a shard on which the original data is stored, or, in some embodiments, may be stored on a separate resource from that which persists the volume.

At step 1012, the redundancy code is applied, for example, by the data storage system, to the determined subset of volumes (e.g., shards, as previously described herein), and additional shards containing data derived from the application of the redundancy code are stored on a predetermined quantity of volumes outside the subset determined in connection with step 1002. For example, the ratio of volumes (e.g., shards as previously described herein) storing the original data to the overall quantity of volumes (including those storing the derived data generated in this step 1012) may be prescribed by the recovery/encoding ratio of the redundancy code applied herein.

At step 1014, in normal operation, requested data may be retrieved, for example, by the data storage system, directly from the subset of volumes storing the original data, without necessitating retrieval and further processing (e.g., by the redundancy code) from the volumes storing the derived data generated in step 1012. However, at step 1016, if any of the volumes are determined, for example, by the data storage system, to be unavailable, a replacement shard may be generated by the data storage system by reconstructing the original data from a quorum of the remaining shards, and re-encoding using the redundancy code to generate the replacement shard. The replacement shard may be the same or may be different from the shard detected as unavailable.

Figure 11:
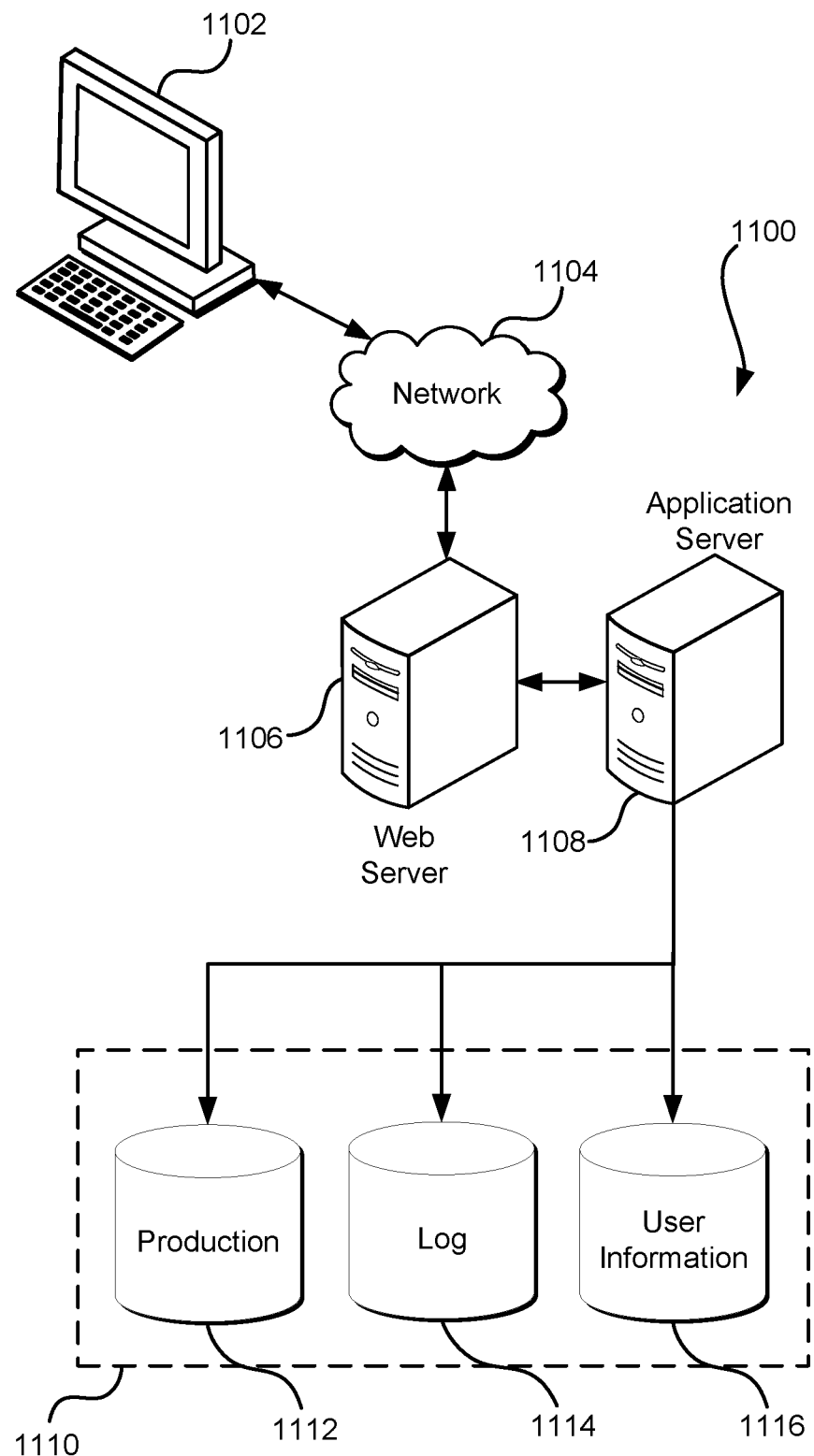
FIG. 11 illustrates an environment in which various embodiments can be implemented.

FIG. 11 illustrates aspects of an example environment 1100 for implementing aspects in accordance with various embodiments. As will be appreciated, although a web-based environment is used for purposes of explanation, different environments may be used, as appropriate, to implement various embodiments. The environment includes an electronic client device 1102, which can include any appropriate device operable to send and/or receive requests, messages, or information over an appropriate network 1104 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network, or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly-addressable communications network, as the environment includes a web server 1106 for receiving requests and serving content in response thereto, although for other networks an alternative device serving a similar purpose could be used as would be apparent to one of ordinary skill in the art.

The illustrative environment includes at least one application server 1108 and a data store 1110. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing, and retrieving data, which may include any combination and number of data servers, databases, data storage devices, and data storage media, in any standard, distributed, virtual, or clustered environment. The application server can include any appropriate hardware, software, and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video, and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually, and/or through other senses.

The handling of all requests and responses, as well as the delivery of content between the client device 1102 and the application server 1108, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 1110 can include several separate data tables, databases, data documents, dynamic data storage schemes and/or other data storage mechanisms and media for storing data relating to a particular aspect of the present disclosure. For example, the data store illustrated may include mechanisms for storing production data 1112 and user information 1116, which can be used to serve content for the production side. The data store also is shown to include a mechanism for storing log data 1114, which can be used for reporting, analysis, or other such purposes. It should be understood that there can be many other aspects that may need to be stored in the data store, such as page image information and access rights information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto. The application server 1108 may provide static, dynamic, or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1102. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of computers, such as desktop, laptop, or tablet computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network. These devices also can include virtual devices such as virtual machines, hypervisors, and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C # or C++, or any scripting language, such as Ruby, PHP, Perl, Python or TCL, as well as combinations thereof. The server(s) may also include database servers, including without limitation those commercially available from Oracle®, Microsoft®, Sybase and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
configuring a data storage system to apportion a bundle of redundancy coded shards between at least durable storage of the data storage system and a data transfer device, the bundle including at least a plurality of identity shards, a first identity shard of the plurality of identity shards containing an original form of data stored in the bundle, and an encoded shard containing a redundancy coded form of the data, the bundle being configured such that a quorum quantity of shards of the bundle is sufficient to reconstruct, using a redundancy code, original data associated with the bundle, the bundle being apportioned such that a first subset of the bundle is apportioned to the data transfer device and second subset of the bundle is apportioned to the durable storage, the first subset of the bundle comprising a subset of the plurality of identity shards and excluding the encoded shard, the second subset of the bundle comprising a remainder of the bundle outside of the first subset of the bundle, the number of shards in the second subset being greater than the quorum quantity;

providing the data transfer device to a different physical location than that of the data storage system, the different physical location being associated with a customer of the data storage system, and the data transfer device is in operable communication with the data storage system;

receiving, by the data transfer device at the different physical location, a first set of customer data;

storing, by the data transfer device at the different physical location, the first set of customer data in the first subset of the bundle;

storing, by the durable storage of the data storage system, a second set of customer data in identity shards of the second subset of the bundle;

processing, using the redundancy code, the first set of customer data and the second set of customer data to generate the encoded shard;

storing, by the durable storage, the encoded shard as part of the second subset of the bundle to enable the durable storage to regenerate, from only the second subset of the bundle, the first set of customer data; and in response to a retrieval request for at least a portion of the first set of customer data:
  if the data transfer device is available, service the retrieval request by at least retrieving the portion of the first subset of customer data from the first subset of the bundle; and
  if the data transfer device is unavailable, service the retrieval request by at least regenerating the portion of the first subset of customer data, using the redundancy code, from the second subset of the bundle.

2. The computer-implemented method of claim 1, further comprising responding to a second retrieval request for at least a portion of the second set of customer data by at least retrieving the portion of the second set of customer data from the second subset of the bundle.

3. The computer-implemented method of claim 1, further comprising responding a second retrieval request for at least a portion of the second set of customer data by regenerating the portion of the second set of customer data, using the redundancy code, from at least one shard of the first subset of the bundle and at least the encoded shard in the second subset of the bundle.

4. The computer-implemented method of claim 1, further comprising causing the data transfer device to transfer the first set of customer data to the data storage system for storage in the durable storage of the data storage system.

5. The computer-implemented method of claim 4, wherein the data transfer device is caused to transfer the first set of customer data to the data storage system after the data transfer device is physically co-located with the data storage system.

6. The computer-implemented method of claim 1, wherein the data storage system is a first data storage system, and further comprising causing the data transfer device to transfer the first set of customer data to a second data storage system that is different than the first data storage system.

7. The computer-implemented method of claim 1, wherein the data transfer device is operably connected to the data storage system via the Internet.

8. The computer-implemented method of claim 1, wherein the data transfer device is a first data transfer device, and further comprising replacing the first data transfer device with a second data transfer device in connection with information indicating that the first data transfer device is at or above a specified capacity threshold.

9. The computer-implemented method of claim 1, wherein the data transfer device is a first data transfer device, and further comprising, in response to receiving information that the first data transfer device is full, at least:
  configuring the bundle to include an additional identity shard;
  apportioning the additional identity shard to a second data transfer device;
  providing the second data transfer device to the different physical location;
  storing a third set of customer data on the second data transfer device; and
  using the redundancy code and the third set of customer data, recalculate the encoded shard.

10. The computer-implemented method of claim 1, wherein the data storage system is configured to apportion shards of the bundle differently between the data storage system and the data transfer device such that encoded shards of the bundle are stored at the redundant storage of the data storage system.

11. The computer-implemented method of claim 1, further comprising:
  receiving a third set of customer data at the data transfer device; and
  updating the encoded shard based at least in part on the redundancy code and the third set of customer data.

12. A system, comprising at least one computing device that implements one or more services, wherein the one or more services at least:
  apportion a bundle of redundancy coded shards between at least durable storage of a first data storage system and a second data storage system, the bundle being configured such that a quorum quantity of shards of the bundle is sufficient to reconstruct, using a redundancy code, original data associated with the bundle, the bundle being apportioned such that a first subset of the bundle is apportioned to the durable storage and a second subset of the bundle is apportioned to the second data storage system, the first subset including a number of shards equal to or greater than the quorum quantity of shards;
  cause storage of a first set of customer data in the first subset of the bundle apportioned to the durable storage of the first data storage system;
  cause storage of a second set of customer data in the second subset of the bundle apportioned to the second data storage system, wherein the second set of customer data is received by the second data storage system while the second data storage system is at a different physical location than the first data storage system, and wherein the second data storage system may, while at the different physical location, communicate with the first data storage system;

process, using the redundancy code, the first set of customer data and the second set of customer data to generate an encoded shard;
store the encoded shard in the first subset of the bundle, wherein the first subset of the bundle is sufficient to enable the first storage system to reconstruct, from only the first subset of the bundle, the second set of customer data;
service a retrieval request for a portion of the second set of customer data, using the redundancy code, from the first subset of the bundle; and
as a result of the second data storage system being moved from the different physical location to the physical location of the data storage system, cause the second data storage system to transfer at least the second set of customer data to the first data storage system for storage in the durable storage of the first data storage system.

13. The system of claim 12, wherein the one or more services are further configured to
if the second subset of the bundle is available, service the retrieval request by at least retrieving the second set of customer data from the second subset of the bundle.

14. The system of claim 12, wherein the one or more services are further configured to, in response to a retrieval request for the first set of customer data, if an original form of the first set of customer data is not directly readable from the first subset of the bundle, service the retrieval request by regenerating the first set of customer data, using the redundancy code and at least one shard of the second subset of the bundle.

15. The system of claim 12, wherein the second data storage system is a data transfer device.

16. The system of claim 15, wherein the data transfer device includes persistent storage configured to store the second subset of the bundle.

17. The system of claim 12, wherein the one or more services are further configured to generate the bundle of redundancy coded shards to include at least a plurality of identity shards, a first identity shard of the plurality of identity shards containing an original form of data stored in the bundle, and an encoded shard containing a redundancy coded form of the data.

18. The system of claim 12, wherein the one or more services are further configured to, while the second data storage system is at the different physical location, cause the first data storage system to receive at least the first set of customer data.

19. A non-transitory computer-readable storage medium comprising executable instructions that, as a result of being executed by one or more processors of a computer system, cause the computer system to at least:
generate, from a first set of data and a second set of data received by the computer system and using a redundancy code, a plurality of erasure coded shards as a bundle of bundle-encoded shards, the plurality of erasure coded shards being configured such that a quorum quantity of the shards of the plurality of erasure coded shards is sufficient to reconstruct, using the redundancy code, the first set of data and the second set of data;
store the shards of the plurality of erasure coded shards on durable storage of a first data storage system and a second data storage system, such that:
a second subset of the shards includes original data of the first second set of data and is apportioned to the durable storage of the first second data storage system; and
a first subset of the shards includes original data of the first data, a first encoded shard generated from the original data of the first set of data, and a second encoded shard generated from the original data of the second set of data, and is apportioned to the first data storage system to enable the first data storage system to regenerate the second set of data using only the first subset of the shards, wherein the second set of data is received at the second data storage system while the second data storage system is at a different physical location than the first data storage system, and wherein the second data storage system is capable of operable communication with the first data storage system at the different physical location;
service a retrieval request for a portion of the second set of data, using the redundancy code, from the first subset of the shards; and
add a third set of data, received by the first data storage system, to the bundle, by at least adding the third set of data to identity shards in the second subset of the shards and updating the encoded shard in the second subset of the shards using the redundancy code.

20. The non-transitory computer-readable storage medium of claim 19, wherein the instructions further cause the computer system to at least add a fourth set of data, received by the second data storage system, to the bundle, by at least adding the fourth set of data to one or more identity shards of the first subset of the shards.

21. The non-transitory computer-readable storage medium of claim 19, wherein the second data storage system is located on a different network than that of the first data storage system, the first data storage system being on a customer network and acting as a proxy for the second data storage system.

22. The non-transitory computer-readable storage medium of claim 19, wherein the redundancy code is a linear erasure code.

23. The non-transitory computer-readable storage medium of claim 19, wherein the instructions further cause the computer system to at least, as a result the second data storage system being moved to a same physical location of the data storage system, cause the second data storage system to transfer at least the second set of customer data to the first data storage system for storage in the durable storage of the first data storage system.

* * * * *